US011240867B2

(12) United States Patent
Abdoli et al.

(10) Patent No.: US 11,240,867 B2
(45) Date of Patent: Feb. 1, 2022

(54) METHOD AND DEVICE FOR CONFIGURING AND USING A BANDWIDTH PART FOR COMMUNICATION IN RADIO RESOURCE CONTROL INACTIVE STATE

(71) Applicants: Javad Abdoli, Kanata (CA); Sanjeewa Herath, Ottawa (CA)

(72) Inventors: Javad Abdoli, Kanata (CA); Sanjeewa Herath, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/664,340

(22) Filed: Oct. 25, 2019

(65) Prior Publication Data

US 2021/0127450 A1 Apr. 29, 2021

(51) Int. Cl.
| | |
|---|---|
| *H04W 76/27* | (2018.01) |
| *H04W 72/04* | (2009.01) |
| *H04W 68/02* | (2009.01) |
| *H04W 52/02* | (2009.01) |
| *H04L 5/00* | (2006.01) |

(52) U.S. Cl.
CPC ....... *H04W 76/27* (2018.02); *H04W 52/0216* (2013.01); *H04W 68/02* (2013.01); *H04W 72/042* (2013.01); *H04L 5/001* (2013.01); *Y02D 30/70* (2020.08)

(58) Field of Classification Search
CPC ............. H04W 76/27; H04W 52/0216; H04W 68/02; H04W 72/042; Y02D 30/70; H04L 5/001
See application file for complete search history.

(56) References Cited

U.S. PATENT DOCUMENTS

| | | | |
|---|---|---|---|
| 9,736,774 B2 | 8/2017 | Au et al. | |
| 9,769,793 B2 | 9/2017 | Zarifi et al. | |

(Continued)

FOREIGN PATENT DOCUMENTS

| | | |
|---|---|---|
| CN | 111194089 A | 5/2020 |
| WO | 2019097104 A1 | 5/2019 |
| WO | 2019160473 A1 | 8/2019 |

OTHER PUBLICATIONS

"3rd Generation Partnership Project; Technical Specification Group Radio Access Network; NR; Radio Resource Control (RRC) protocol specification" (Release 15). Technical Specification. 3GPP TS 38.331 V15.7.0. Sep. 2019. 526 pages.

(Continued)

*Primary Examiner* — Omar J Ghowrwal

(57) ABSTRACT

Some aspects of the present disclosure introduce a new downlink (DL) bandwidth part (BWP) and a new uplink (UL) BWP for communication in the RRC_INACTIVE state. In addition, aspects of the disclosure also provide for configuring generic parameters of the BWP, which include, but not limited to, frequency location, bandwidth, subcarrier spacing (SCS), and cyclic prefix (CP). Some aspects of the present disclosure may support a reinterpretation of generic parameters of a BWP, for example which may be configured for the RRC_CONNECTED state, to be used in the RRC_INACTIVE state. Some aspects of the present disclosure are directed to implicit DL BWP switching in the RRC_INACTIVE state where no BWP identifier (ID) indication is needed as part of the switching mechanism.

31 Claims, 14 Drawing Sheets

(56) References Cited

U.S. PATENT DOCUMENTS

| | | | |
|---|---|---|---|
| 2015/0195788 A1 | 7/2015 | Au et al. | |
| 2018/0097679 A1 | 4/2018 | Zhang et al. | |
| 2019/0158229 A1* | 5/2019 | Wei | H04L 1/1848 |
| 2019/0261425 A1* | 8/2019 | Park | H04L 5/0053 |
| 2020/0045674 A1* | 2/2020 | Tseng | H04W 76/19 |
| 2020/0084698 A1* | 3/2020 | Rune | H04W 48/10 |
| 2020/0100297 A1* | 3/2020 | Agiwal | H04W 74/0833 |
| 2020/0396654 A1* | 12/2020 | Freda | H04W 36/06 |
| 2021/0045017 A1* | 2/2021 | Takeda | H04W 76/27 |

OTHER PUBLICATIONS

Huawei et al., "BWP issues for SA", 3GPP TSG-RAN WG2 Meeting #AH-1801 R2-1800654, Vancouver, Canada, Jan. 22-26, 2018, 4 pages.

* cited by examiner

METHOD AND DEVICE FOR CONFIGURING AND USING A BANDWIDTH PART FOR COMMUNICATION IN RADIO RESOURCE CONTROL INACTIVE STATE

TECHNICAL FIELD

The present disclosure relates generally to wireless communications, and in particular embodiments, to control signaling in wireless communication networks.

BACKGROUND

In some wireless communication networks, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or a device-to-device (D2D) communication.

In 3GPP New Radio (NR), a UE may operate in one of the following three states: RRC_IDLE, RRC_CONNECTED and RRC_INACTIVE. In the RRC_CONNECTED state, a UE is connected to the network following a connection establishment procedure. In the RRC_IDLE state, a UE is not connected to the network, but the network knows that the UE is present in the network. Switching to the RRC_IDLE state helps save network resources and UE power (for example, battery life) when the UE is not communicating with the network. The RRC_INACTIVE state also helps save network resources and UE power when the UE is not communicating with the network. However, unlike the RRC_IDLE state, when a UE is in the RRC_INACTIVE state the network and the UE both store at least some configuration information to allow the UE to reconnect to the network more rapidly.

Improved mechanisms for operation in the RRC_INACTIVE state would be beneficial for communication systems.

SUMMARY

According to a first aspect of the disclosure, there is provided a method involving, while in a radio resource control (RRC)_CONNECTED state, a user equipment (UE) determining configuration information for configuring a bandwidth part (BWP) for communication in an RRC_INACTIVE state. The method also involves the UE entering the RRC_INACTIVE state and the UE using the configured BWP for communication in the RRC_INACTIVE state.

In some embodiments, determining configuration information for configuring the BWP for communication in the RRC_INACTIVE state involves receiving the configuration information.

In some embodiments, the configuration information explicitly defines BWP parameters for the configured BWP for communication in the RRC_INACTIVE state.

In some embodiments, the configuration information indicates a BWP identifier that identifies a previously configured BWP that will be used for communication in the RRC_INACTIVE state.

In some embodiments, the configuration information indicates that the configured BWP is a last active BWP of the UE in the RRC_CONNECTED state before the UE enters the RRC_INACTIVE state.

In some embodiments, the method further involves, when in the RRC_INACTIVE state, receiving downlink control information that includes scheduling information.

In some embodiments, the scheduling information includes: scheduling information for receiving downlink data while in the RRC_INACTIVE state; or scheduling information for receiving paging information that includes scheduling information for receiving downlink data while in the RRC_INACTIVE state.

In some embodiments, the configured BWP for communication in the RRC_INACTIVE state involves the UE transmitting uplink data in the configured BWP for communication in the RRC_INACTIVE state.

In some embodiments, the configuration information for configuring the BWP for communication in the RRC_INACTIVE state includes an extended cyclic prefix (CP).

In some embodiments, the extended CP is for an uplink BWP.

In some embodiments, the method further involves, when in the RRC_INACTIVE state, switching to the configured BWP for communication in the RRC_INACTIVE state.

In some embodiments, the switching occurs when a pre-defined condition is met,

In some embodiments, the pre-defined condition is one of: the configured BWP for communication in the RRC_INACTIVE state has a different frequency location and bandwidth or a different sub-carrier spacing (SCS) or a different cyclic prefix (CP) than control resource set 0 (CORESET 0); or the configured BWP for communication in the RRC_INACTIVE state does not include all resource blocks of CORESET 0 or has a different SCS or a different CP than CORESET 0.

In some embodiments, the method further involves, when in the RRC_INACTIVE state, switching to control resource set 0 (CORESET 0) from the configured BWP for communication in the RRC_INACTIVE state.

According to a second aspect of the disclosure, there is provided a user equipment (UE) including a processor and a computer-readable storage media having stored thereon, computer executable instructions. When executed by the processor, the computer executable instructions cause the UE to: while in a radio resource control (RRC)_CONNECTED state, determine configuration information for configuring a bandwidth part (BWP) for communication in a RRC_INACTIVE state; enter the RRC_INACTIVE state; and use the configured BWP for communication in the RRC_INACTIVE state.

In some embodiments, the computer executable instructions to determine configuration information for configuring the BWP for communication in the RRC_INACTIVE state comprise computer executable instructions to receive the configuration information.

In some embodiments, the configuration information explicitly defines BWP parameters for the configured BWP for communication in the RRC_INACTIVE state.

In some embodiments, the configuration information indicates a BWP identifier that identifies a previously configured BWP that will be used for communication in the RRC_INACTIVE state.

In some embodiments, the configuration information indicates that the configured BWP for communication in the RRC_INACTIVE state is a last active BWP of the UE in the RRC_CONNECTED state before the UE enters the RRC_INACTIVE state.

In some embodiments, when in the RRC_INACTIVE state, the computer readable instructions when executed by the processor cause the UE to receive downlink control information that includes scheduling information.

In some embodiments, the scheduling information includes: scheduling information for receiving downlink data while in the RRC_INACTIVE state; or scheduling information for receiving paging information that includes scheduling information for receiving downlink data while in the RRC_INACTIVE state.

In some embodiments, the computer executable instructions to use the configured BWP for communication in the RRC_INACTIVE state comprise computer executable instructions to transmit uplink data in the configured BWP for communication in the RRC_INACTIVE state.

In some embodiments, the configuration information for configuring the BWP for communication in the RRC_INACTIVE state includes an extended cyclic prefix (CP), wherein the extended CP is for an uplink BWP.

In some embodiments, when in the RRC_INACTIVE state, the computer readable instructions when executed by the processor cause the UE to switch to the configured BWP for communication in the RRC_INACTIVE state.

In some embodiments, the switching occurs when a pre-defined condition is met, wherein the pre-defined condition is one of: the configured BWP for communication in the RRC_INACTIVE state has a different frequency location and bandwidth or a different sub-carrier spacing (SCS) or a different cyclic prefix (CP) than control resource set 0 (CORESET 0); or the configured BWP for communication in the RRC_INACTIVE state does not include all resource blocks of CORESET 0 or has a different SCS or a different CP than CORESET 0.

In some embodiments, when in the RRC_INACTIVE state, the computer readable instructions when executed by the processor cause the UE to switch to control resource set 0 (CORESET 0) from the configured BWP for communication in the RRC_INACTIVE state.

According to a third aspect of the disclosure, there is provided a method involving a network side device determining configuration information for configuring a bandwidth part (BWP) for communication in an RRC_INACTIVE state. The method further involves the network side device transmitting signalling indicating a suspension of a radio resource control (RRC)_CONNECTED state resulting in a user equipment (UE) entering the RRC_INACTIVE state. The method further involves the network side device using the configured BWP for the RRC_INACTIVE state for communication with the UE when the UE is in the RRC_INACTIVE state.

In some embodiments, the method further involves the network side device transmitting the configuration information for configuring the RRC_INACTIVE state BWP for use by the UE for communication in the RRC_INACTIVE state.

In some embodiments, the configuration information explicitly defines BWP parameters for the configured BWP for communication in the RRC_INACTIVE state.

In some embodiments, the configuration information indicates a BWP identifier that identifies a previously configured BWP that will be used for communication in the RRC_INACTIVE state.

In some embodiments, the configuration information indicates that the configured BWP is a last active BWP of the UE in the RRC_CONNECTED state before the UE enters the RRC_INACTIVE state.

In some embodiments, the method further involves, when the UE is in the RRC_INACTIVE state, transmitting downlink control information that includes scheduling information.

In some embodiments, the scheduling information includes: scheduling information for receiving downlink data while in the RRC_INACTIVE state; or scheduling information for receiving paging information that includes scheduling information for receiving downlink data while in the RRC_INACTIVE state.

In some embodiments, using the configured BWP for communication in the RRC_INACTIVE state involves the network side device receiving uplink data in the configured BWP for communication in the RRC_INACTIVE state.

In some embodiments, the configuration information for configuring the BWP for communication in the RRC_INACTIVE state includes an extended cyclic prefix (CP).

In some embodiments, the extended cyclic prefix (CP) is for an uplink BWP.

In some embodiments, the method further involves, when the UE is in the RRC_INACTIVE state, the network side device using control resource set 0 (CORESET 0) for communication in the RRC_INACTIVE state.

According to a fourth aspect of the disclosure, there is provided a network device including a processor and a computer-readable storage media having stored thereon computer executable instructions. When executed by the processor, the computer executable instructions cause the network device to: determine configuration information for configuring a bandwidth part (BWP) for communication in an RRC_INACTIVE state; transmit signalling indicating a suspension of a radio resource control (RRC)_CONNECTED state resulting in a user equipment (UE) entering the RRC_INACTIVE state; and use the BWP configured for RRC_INACTIVE state for communication with the UE when the UE is in the RRC_INACTIVE state.

In some embodiments, the computer executable instructions when executed by the processor cause the network side device to transmitting the configuration information for configuring the RRC_INACTIVE state BWP for use by the UE for communication in the RRC_INACTIVE state.

In some embodiments, the configuration information explicitly defines BWP parameters for the configured BWP for communication in the RRC_INACTIVE state.

In some embodiments, the configuration information indicates a BWP identifier that identifies a previously configured BWP that will be used for communication in the RRC_INACTIVE state.

In some embodiments, the configuration information indicates that the configured BWP for communication in the RRC_INACTIVE state is a last active BWP of the UE in the RRC_CONNECTED state before the UE enters the RRC_INACTIVE state.

In some embodiments, when in the RRC_INACTIVE state, the computer readable instructions when executed by the processor cause the network side device to transmit downlink control information that includes scheduling information.

In some embodiments, the scheduling information includes: scheduling information for the UE to receive downlink data while in the RRC_INACTIVE state; or scheduling information for the UE to receive paging information that includes scheduling information for receiving downlink data while in the RRC_INACTIVE state.

In some embodiments, the computer executable instructions when executed by the processor cause the network side device to use the configured BWP for communication in the RRC_INACTIVE state comprise computer executable instructions to receive uplink data in the configured BWP for communication in the RRC_INACTIVE state.

In some embodiments, the configuration information for configuring the BWP for communication in the RRC_INACTIVE state includes an extended cyclic prefix (CP), wherein the extended CP is for an uplink BWP.

In some embodiments, when in the RRC_INACTIVE state, the computer readable instructions when executed by the processor cause the network side device to use control resource set 0 (CORESET 0) for communication in the RRC_INACTIVE state.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

FIGS. 1, 2A, 2B and 3 illustrate examples of networks and devices that could implement any or all aspects of the present disclosure.

Figure 1:
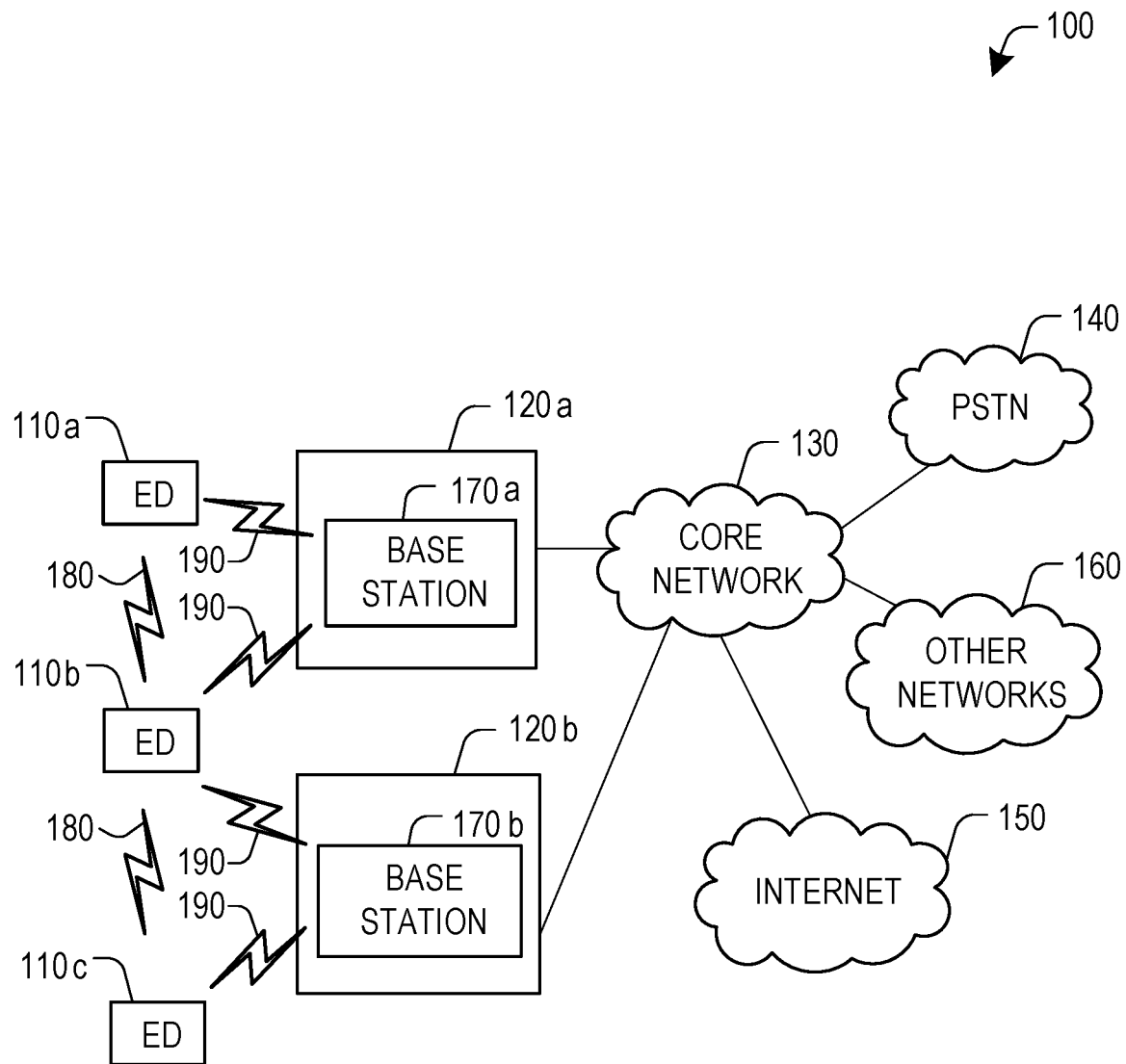
FIG. 1 is a schematic diagram of a communication system in which embodiments of the disclosure may occur.

FIG. 1 illustrates an example communication system 100. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. Although certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170a-170b may establish an air interface 190 with Evolved UTMS Terrestrial Radio Access (E-UTRA) using LTE, LTE-A, LTE-B and/or 5G New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more SL air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In this disclosure, the SL transmissions between cooperating UEs may be "grant-free" transmissions or as a mode for data transmissions that are performed without communicating dynamic scheduling. Grant-free transmissions are sometimes called "configured grant", "grant-less", "schedule free", or "schedule-less" transmissions. Grant-free SL transmissions can also be referred to as SL "transmission without grant", "transmission without dynamic grant", "transmission without dynamic scheduling", or "transmission using configured grant", for example.

A configured grant transmission typically requires the receiver to know the parameters and resources used by the transmitter for the transmission. However, in the context of SL transmissions, the receiving UE is typically not aware of the transmitting UE's configuration parameters, such as which UE is transmitting, the ultimate target of the data (e.g., another UE), the time-domain and frequency-domain communication resources used for the transmission, and other control information. The various methods will, however, each incur a respective overhead penalty.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

Figure 2A:
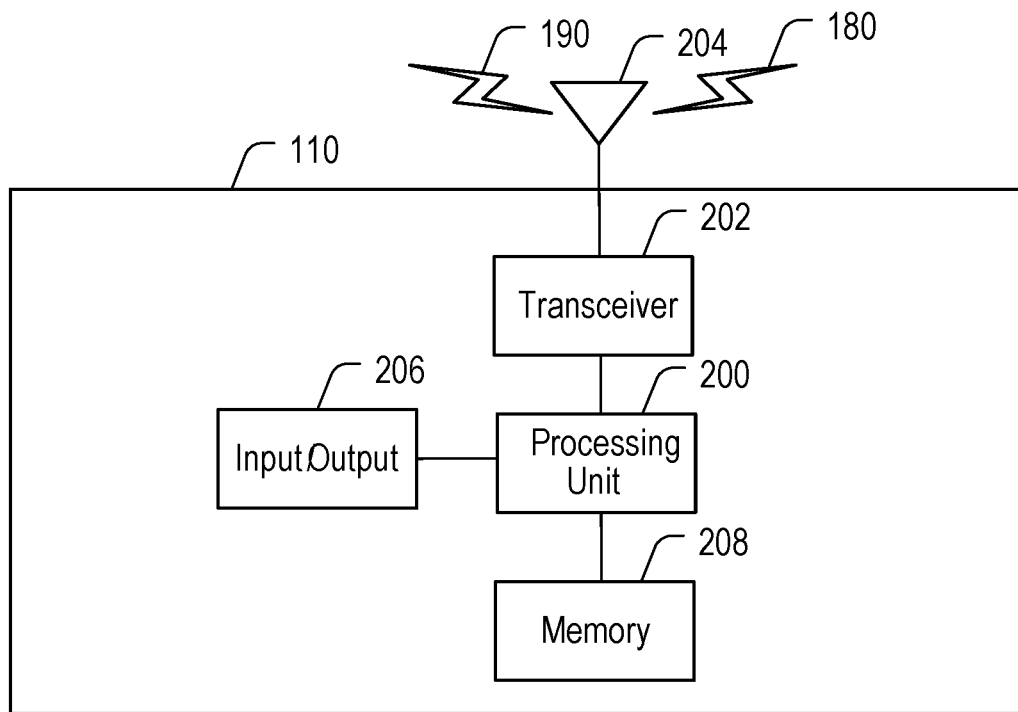
FIGS. 2A and 2B are block diagrams of an example user equipment and base station, respectively, according to aspects of the present disclosure.
Figure 2B:
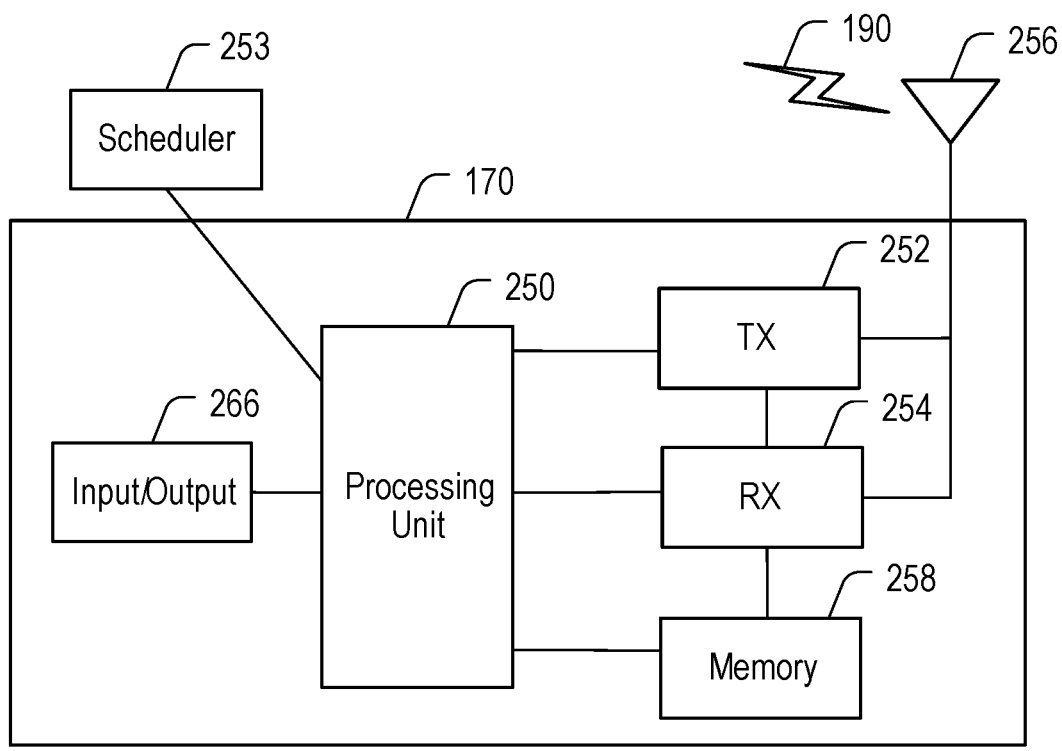

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processor or processing unit 200. The processing unit 200 implements various processing operations of the ED 110. For example, the processing unit 200 could perform signal coding, bit scrambling, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, bit scrambling, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the UEs 110 and the base stations 170 are known to those of skill in the art. As such, these details are omitted here for clarity.

Figure 3:
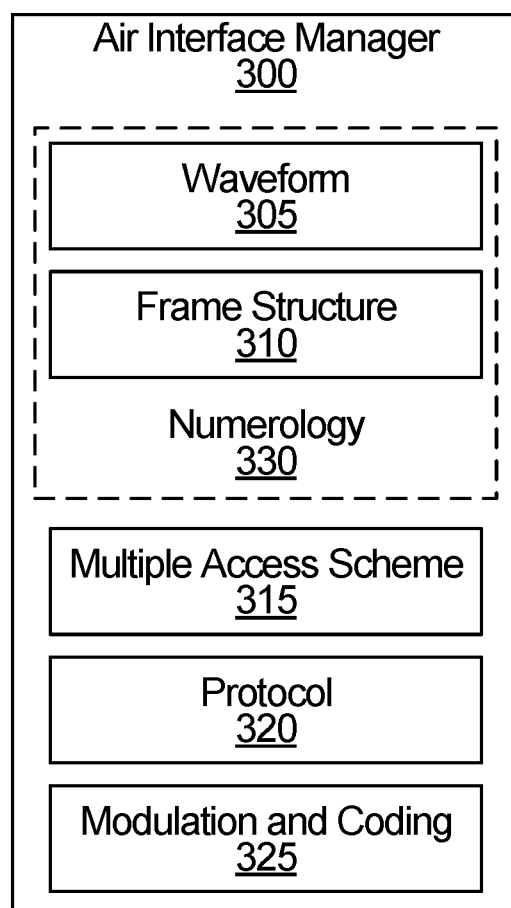
FIG. 3 is a block diagram of an air interface manager for configuring a software-configurable air interface according to an aspect of the present disclosure.

FIG. 3 illustrates a schematic diagram of an air interface manager 300 for configuring a software-configurable air interface 190. The air interface manager 300 may be, for example, a module including a number of components or building blocks that define the parameters of the air interface 190 and collectively specify how a transmission is to be made and/or received by the air interface 190. The air interface manger 300 could also or instead define the parameters of the SL air interface 180 and collectively specify how a transmission is to be made and/or received by the SL air interface 180

The components of the air interface manger 300 include at least one of a waveform component 305, a frame structure component 310, a multiple access scheme component 315, a protocol component 320, and a modulation and coding component 325.

The waveform component 305 may specify a shape and form of a signal being transmitted. Waveform options may include orthogonal multiple access waveforms and non-orthogonal multiple access waveforms. Non-limiting examples of such waveform options include Single-Carrier (SC), Ultra-Wideband (UWB), Frequency Modulated Continuous Wave (FMCW), Linear Frequency Modulated (LFM), Orthogonal Frequency Division Multiplexing (OFDM), Single-Carrier Frequency Division Multiple Access (SC-FDMA), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF). In some embodiments, a combination of waveform options is possible.

The frame structure component 310 may specify a configuration of a frame or group of frames. The frame structure component 310 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval, TTI, or a transmission time unit, TTU). The frame structure component may also specify whether the time slot is a configurable multi-level TTI, a fixed TTI, or a configurable single-level TTI. The frame structure component may further specify a co-existence mechanism for different frame structure configurations.

For some waveforms, such as certain OFDM-based waveforms, the frame structure component may also specify one or more associated waveform parameters, such as sub-carrier spacing width, symbol duration, cyclic prefix (CP) length, channel bandwidth, guard bands/subcarriers, and sampling size and frequency.

Additionally, the frame structure component 310 may further specify whether the frame structure is used in a time-division duplex communication or a frequency-division duplex communication.

Additionally, the frame structure component 310 may further specify the transmission state and/or direction for each symbol in a frame. For example, each symbol may independently be configured as a downlink symbol, an uplink symbol, or a flexible symbol.

Together, the specifications of the waveform component and the frame structure component are sometimes known as the "numerology." Thus, the air interface 190 may include a numerology component 330 defining a number of air interface configuration parameters, such as the sub-carrier spacing, CP length, symbol length, slot length, and symbols per slot.

These numerologies, also known as subcarrier spacing configurations, may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using one or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz subcarrier spacing. A numerology with 15 kHz subcarrier spacing may be compatible with LTE. A numerology with 15 kHz subcarrier spacing may serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths. In addition, subcarrier spacing may depend on the operational frequency band. For example, the subcarrier spacing in millimeter wave frequencies may be higher than in lower frequencies.

It is further contemplated that other subcarrier spacings may be used, such as higher or lower subcarrier spacings. For example, other subcarrier spacings varying by a factor of $2^n$ include 120 kHz and 3.75 kHz.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipments (UEs).

The use of different numerologies can allow the air interface 190 to support coexistence of a diverse set of use cases having a wide range of quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

Continuing with the components of the air interface 190, the multiple access scheme component 315 may specify how access to a channel is granted for one or more EDs. Non-limiting examples of multiple access technique options include technologies defining how EDs share a common physical channel, such as: Time Division Multiple Access (TDMA), Frequency Division Multiple Access (FDMA), Code Division Multiple Access (CDMA), Space Division Multiple Access (SDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, the multiple access technique options may include scheduled access, non-scheduled access, also known as grant-free access or configured grant, contention-based shared channel resource, non-contention-based shared channel resource, and cognitive radio-based access.

The protocol component 320 may specify how a transmission and/or a re-transmission are to be made. Non-limiting examples of transmission and/or re-transmission mechanism options include those that specify a scheduled data pipe size and a signaling mechanism for transmission and/or re-transmission.

The modulation and coding component 325 may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to Quadrature Amplitude Modulation (QAM) specified by a complex constellation (including, for example, the modulation technique and order, e.g. 16QAM, 64QAM, etc.), or more specifically to various types of advanced modulation methods such as hierarchical modulation, multi-dimensional modulation and low Peak-to-Average Power Ratio (PAPR) modulation.

Because an air interface includes a plurality of components or building blocks, and each component may have a plurality of candidate technologies (also referred to herein as air interface capability options), the air interface manager 300 may configure and store a large number of different air interface profiles. Each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 300 and used for communications between the pair of communicating transmitting-receiving devices.

In further embodiments, the air interface manager 300 may modify or update its components, profiles, or capability options. For example, the air interface manager 300 may replace the waveform and frame structure components 305, 310, with a single numerology component 330. Conversely, the air interface manager 300 may separate the modulation and coding component 325 into an individual coding component and an individual modulation component. Furthermore, the air interface manager 300 is configurable such that new soft air interface configuration components developed in the future should be able to be utilized.

The air interface manager 300 may also update certain components to modify the capability options of any given component. For example, the air interface manager 300 may update the modulation and coding component 325 to include higher-order modulation schemes.

By updating the stored components, profiles, and candidate options, the air interface manager 300 can flexibly adapt to better accommodate diverse wireless traffic types and services. Modifying or updating components, profiles, and candidate options may allow the air interface manager 300 to provide suitable air interface profiles for traffic types or services other than those already contemplated for ultra-reliable low latency communications (URLLC), enhanced mobile broadband (eMBB), and massive machine-type communications (mMTC).

As noted above, in 3GPP New Radio (NR), a UE may operate in one of the following three states: RRC_IDLE, RRC_CONNECTED and RRC_INACTIVE.

The RRC_CONNECTED state is a non-limiting example of a connected or active state. A UE in the RRC_CONNECTED state is connected to the radio access network (RAN) and to the core network (CN). The UE could enter the RRC_CONNECTED state from the RRC_IDLE state following a connection establishment procedure or from the RRC_INACTIVE state following a connection resumption procedure, for example. The RRC_CONNECTED state can be characterized as including the following features:

- the UE stores the access stratum (AS) context;
- a transfer of unicast data to and from the UE is supported;
- at lower layers, the UE may be configured with UE-specific discontinuous reception (DRX);
- for UEs supporting carrier aggregation (CA), use of one or more secondary cells (SCells), aggregated with a special cell (SpCell), is supported for increased bandwidth;
- for UEs supporting dual connectivity (DC), use of a secondary cell group (SCG), aggregated with the master cell group (MCG), is supported for increased bandwidth;
- network controlled mobility is supported within a NR network and to/from an E-UTRA network;
- the UE monitors short messages transmitted with a paging radio network temporary identifier (P-RNTI) over downlink control information (DCI), if configured;
- the UE monitors control channels associated with the shared data channel to determine if data is scheduled for the UE;
- the UE provides channel quality and feedback information to the network;
- the UE performs neighboring cell measurements and measurement reporting; and
- the UE acquires system information.

The RRC_IDLE state is a non-limiting example of an idle or disconnected state. A UE in the RRC_IDLE state is not connected to the RAN or the CN, and the UE may need to perform an initial access procedure to establish a connection to the network and transition to the RRC_CONNECTED state. The RRC_IDLE state can be characterized as including the following features:

- UE-specific DRX may be configured by upper layers of the network;
- UE controlled mobility is based on network configuration;
- the UE monitors short messages transmitted with the P-RNTI over DCI;
- the UE monitors a paging channel for CN paging using a 5G system architecture evolution temporary mobile station identifier (5G-S-TMSI);
- the UE performs neighboring cell measurements and cell selection or cell reselection; and
- the UE acquires system information (SI) and can send a SI request, if configured.

The RRC_INACTIVE state is a non-limiting example of an inactive state. A UE in an inactive state uses fewer network resources and/or less power than a UE in a connected state. This may save battery life at the UE. When a UE transitions to the inactive state, configuration information for the UE is stored by the UE and the network. This allows the UE to return to the connected state relatively quickly and efficiently. For example, a UE may use less signaling to transition from an inactive state to a connected state than from an idle state to a connected state.

The RRC_INACTIVE state could be considered to lie between the RRC_CONNECTED and RRC_IDLE states. In the RRC_INACTIVE state, at least a portion of the UE's AS context is stored by both the UE and the network, which allows the network to communicate with the UE. Therefore, secure and fast signaling could occur between the network and the UE. Moreover, a UE in the RRC_IDLE state might only support CN paging that is performed in the tracking area where the UE is located. In contrast, a UE in the RRC_INACTIVE state may, in addition to CN paging, also support RAN paging that is performed in the RAN notification area (RNA) where the UE is located. Because a RNA typically covers a smaller number of cells than a tracking area, RAN paging in the RRC_INACTIVE state may incur less DL resource consumption and/or overhead. The RRC_INACTIVE state can be characterized as including the following features:

UE-specific DRX may be configured by upper layers of the network or by the RRC layer;
UE controlled mobility is based on network configuration;
the UE stores an inactive AS context, which could be different from the AS context used in the RRC_CONNECTED state;
a RAN-based notification area is configured by the RRC layer;
the UE monitors short messages transmitted with P-RNTI over DCI;
the UE monitors a paging channel for CN paging using 5G-S-TMSI and RAN paging using a FulII-RNTI;
the UE performs neighboring cell measurements and cell selection or cell reselection;
the UE performs RAN-based notification area updates periodically and when moving outside the configured RAN-based notification area; and
the UE acquires SI and can send an SI request, if configured.

The RRC_INACTIVE state is implemented in NR, but in general an inactive state could be implemented in any wireless protocol or radio technology. Accordingly, inactive states are not limited to a particular wireless protocol or radio technology. Similar comments apply to idle states and connected states.

A UE can transition from a connected state to an inactive state using a suspend procedure, and transition back to the connected state using a resume procedure. The UE can also transition from the inactive state to the idle state using a release procedure. The transition from the connected state to the inactive state is invisible to the CN. Therefore, when a UE is in the inactive state, UE-related signaling and data exchange can occur between the RAN and the CN. From the perspective of the CN, a UE in the inactive state is treated in a similar manner to a UE in the connected state. For example, from the perspective of the CN, a UE may have two connection management (CM) states. The UE is either in a CM-CONNECTED state or a CM-IDLE state. A UE in the CM-IDLE state in the CN is in the RRC_IDLE state from the RAN point of view, whereas a UE in the CM-CONNECTED state in the CN may be either in the RRC_CONNECTED state or the RRC_INACTIVE state from the RAN point of view. The UE's security context and/or other portions of the UE's context is/are stored by the UE and by the network before the UE transitions from the connected state to the inactive state. Thus, the network can quickly and securely transmit signaling to the UE for a transition from the inactive state to the connected or idle states.

In NR Rel-15, when a UE is in the RRC_INACTIVE state or the RRC_IDLE state, the UE monitors a Paging Common Search Space (CSS) set and receives a paging signal on physical downlink shared channel (PDSCH) in control resource set (CORESET) with ID 0, which is often referred to as CORESET 0. A CORESET is a set of physical resources, e.g. a set of resource blocks (RBs) and a number of symbols, over which a physical downlink control channel (PDCCH) may be transmitted and a set of other physical parameters that may be used to transmit PDCCH. A PDCCH may include downlink control information (DCI). A search space set provides all the parameters needed for a UE to be able to monitor a PDCCH. CORESETs may be separately configured and linked to a search space set as part of the search space set configuration. Alternatively, CORESET parameters may be configured directly as part of a search space set configuration. The parameters provided in a search space set configuration, in addition to CORESET parameters, may include, but are not limited to: a PDCCH monitoring periodicity, a PDCCH monitoring pattern within a slot, a number of slots where the search space set exists, control channel element (CCE) aggregation level(s), a number of PDCCH candidates for each aggregation level, a type of the search space set, e.g. either common search space (CSS) or UE-specific search space (USS), and DCI format(s) to be monitored in the search space set.

In NR Rel-15, a bandwidth part (BWP) is a set of contiguous resource blocks (RBs) with a given numerology on a given carrier. The set of contiguous RBs of a BWP is identified by its frequency location and bandwidth. A BWP can be a DL BWP, which is used for DL communications between a UE and a base station, or an UL BWP, which is used for UL communications between the UE and the base station. A UE-specific DL or UL BWP is configured to the UE using UE-specific higher layer signaling. In NR Rel-15, a UE can be configured with more than one DL BWP and more than one UL BWP, with a single DL BWP and a single UL BWP being active for the UE at a given time. A DL BWP can be cell-specific, such as the DL BWP defined by the contiguous RBs of CORESET 0, which can be configured per cell e.g. through master information block (MIB) transmission. An UL BWP can also be cell-specific, such as the initial UL BWP which can be configured per cell e.g. through system information block (SIB) transmission.

For uplink (UL), a 4-step RACH or possibly a 2-step RACH may be supported for a UE in the RRC_INACTIVE state, in which an UL transmission is transmitted in the initial UL BWP.

CORESET 0 is intended to be used by all UEs for DL communication at least during initial access to the cell and possibly for many UEs connected to the cell after the initial access to the cell. Because CORESET 0 may span only a portion of the carrier bandwidth in DL, restriction of using CORESET 0 for DL communication, e.g. DL data and DL control transmissions, in the RRC_INACTIVE state may overload the bandwidth of CORESET 0, because there are potentially many UEs with small packet traffic in the RRC_INACTIVE state.

Initial UL BWP is intended to be used by all UEs for UL communication at least during initial access to the cell and possibly for many UEs connected to the cell after the initial access to the cell. Because the initial UL BWP may span only a portion of the carrier bandwidth in UL, the restriction of using the initial UL BWP for UL communication, e.g. UL data and/or UL control and/or UL reference signal transmissions, in the RRC_INACTIVE state may overload the bandwidth of the initial UL BWP, because there are potentially many UEs with small packet traffic in the RRC_INACTIVE state.

In the present disclosure, mechanisms are proposed for configuration of resources (frequency and time) for transmission in the RRC_INACTIVE state, so that more efficient and flexible resource management may be achieved.

The air interface parameters currently supported in NR, e.g. cyclic prefix (CP) lengths, may not provide an acceptable support of UL timing adjust (TA)—free transmissions for a UE in the RRC_INACTIVE state.

Some aspects of the present disclosure introduce a new DL BWP, called INACTIVE DL BWP, for DL communication in RRC_INACTIVE state. A new UL BWP, called INACTIVE UL BWP, for UL communication in RRC_I-NACTIVE state is also introduced. In addition, aspects of the disclosure also provide for configuring the generic parameters of the INACTIVE DL BWP or INACTIVE UL BWP, which include, but not limited to, frequency location, bandwidth, subcarrier spacing (SCS), and CP.

The INACTIVE DL BWP or INACTIVE UL BWP can be specific to particular UEs being served by a base station (UE-specific), specific to particular group of UEs being served by a base station (group-common), or applied to all UE being served by a base station (cell-specific BWP).

A result of the above configuration is that every UE-specific DL reception or UL transmission in the RRC_I-NACTIVE state occurs within the INACTIVE DL (UL) BWP.

In some embodiments, such a configuration may result in new BWP configuration parameters.

A benefit of the INACTIVE DL BWP or INACTIVE UL BWP for the RRC_INACTIVE state may be efficient resource management for data transmission in the RRC_I-NACTIVE state, for example because the network may not be restricted to use only CORETSET 0 for DL communication with UEs in RRC_INACTIVE state or to use only the initial UL BWP for UL communication with UEs in RRC_I-NACTIVE state.

Some aspects of the present disclosure may support a reinterpretation of configured parameters of a BWP, for example generic parameters of a BWP, which may be configured for the RRC_CONNECTED state, to be used in the RRC_INACTIVE state.

This reinterpretation of BWPs configured for another state, such as the RRC_CONNECTED state, to be used in the RRC_INACTIVE state, can be specific to particular UEs being served by a base station (UE-specific) or specific to particular group of UEs being served by a base station (group-common), or applied to all UE being served by a base station (cell-specific BWP).

Some embodiments of the above configuration mechanism result in new UE behaviors with respect to some existing BWP configuration parameters.

Some embodiments of the above configuration mechanism result in defining new CP lengths for UL.

Being able to reinterpret parameter information for the RRC_INACTIVE state based on parameter information from another state may be beneficial, because the reinterpretation may not necessitate any significant changes to radio resource control mechanisms currently being used.

Another benefit of this approach may be that it supports longer CPs for UL TA-free transmission in RRC_INACTIVE state.

Some aspects of the present disclosure are directed to implicit DL BWP switching in the RRC_INACTIVE state where no BWP identifier (ID) indication is needed as part of the switching mechanism.

Some embodiments pertain to defining conditions for DL BWP switching in the RRC_INACTIVE state. Some embodiments pertain to implicit DL BWP switching before receiving unicast or multicast PDSCH. Some embodiments pertain to autonomous DL BWP switching after receiving unicast or multicast PDSCH.

Some embodiments pertain to defining conditions for UL BWP switching in the RRC_INACTIVE state. Some embodiments pertain to implicit UL BWP switching before transmitting PUSCH. Some embodiments pertain to autonomous UL BWP switching after transmitting PUSCH.

Some embodiments of the above configuration mechanism result in defining new UE behaviors with respect to DCI based DL scheduling or Paging based DL scheduling, or both.

Some embodiments of the above configuration mechanism result in defining new BWP switching delay for the RRC_INACTIVE state.

Aspects of controlling switching of DL BWPs in the RRC_INACTIVE state may result in efficient resource management for data transmission in the RRC_INACTIVE state, power savings at the UE by adjusting the radio frequency bandwidth (RF BW) and support of different numerologies for paging and transmission of unicast DL data.

Embodiment 1-0

Some aspects of the present application relate to configuration of generic parameters of BWP for the RRC_INACTIVE state. The RRC_INACTIVE state may also be referred to as the INACTIVE BWP state.

Some embodiments of the disclosure provide a configuration for a UE-specific DL BWP or UE-specific UL BWP. Some embodiments of the disclosure provide a configuration for a group-common DL BWP or group-common UL BWP.

In some embodiments, the configuration is an explicit configuration of the BWP parameters. For example the DL or UL BWP is explicitly configured in ServingCellConfig parameter or in an RRCRelease message sent as part of a suspension of the active RRC connection.

In some embodiments, the DL or UP BWP may be configured implicitly.

In a first example of a configuration implemented implicitly, a DL or UL BWP is configured by indicating a BWP-Id. The BWP-Id identifies a DL or UL BWP that has been previously configured in a ServingCellConfig parameter or in an RRCRelease for suspension of the connection. In some embodiments, this may be implemented by pointing to one of the DL or UL BWPs in a downlinkBWP-ToAddModList parameter or an uplinkBWP-ToAddModList parameter.

In a second example, a DL BWP used for the RRC_I-NACTIVE state is based on the active DL BWP used by the UE in which the UE receives the physical downlink shared channel (PDSCH) containing an RRCRelease message in the RRC_CONNECTED state that suspends the RRC connection.

In a third example, a DL BWP used for the RRC_INACTIVE state is based on the last active DL BWP of the UE before transitioning to the RRC_INACTIVE state.

FIGS. 4A to 4D illustrate four different examples of the configured INACTIVE DL BWP following a transition from the RRC_CONNECTED state to RRC_INACTIVE state. In each of the figures the horizontal axis corresponds to time, increasing from left to right and the vertical axis corresponds to frequency. The various blocks shown in the figures represent frequency resources of BWPs.

Figure 4A:
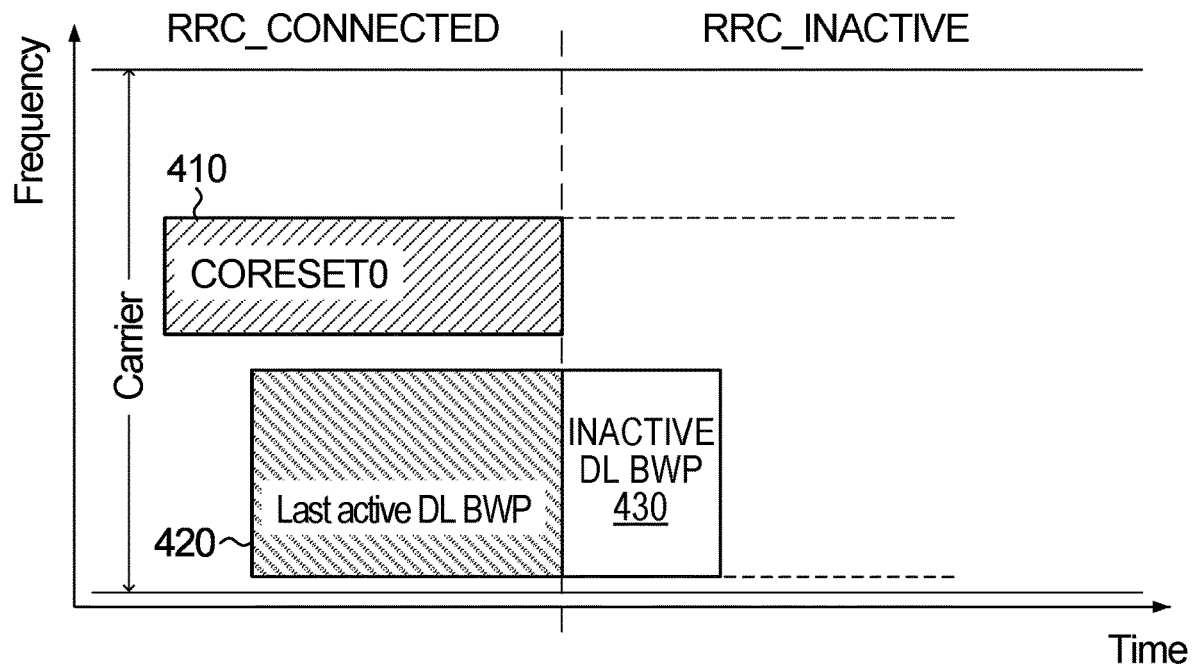
FIGS. 4A to 4D illustrate four different examples of the configured INACTIVE DL BWP following a transition from the RRC_CONNECTED state to RRC_INACTIVE state, according to aspects of the present disclosure.

In FIG. 4A, two BWPs are shown in the portion of time indicated to be in the RRC_CONNECTED state. A first BWP is CORESET 0 410, or more particularly, the set of contiguous RBs of CORESET 0 410. A second BWP is a last active DL BWP 420. The two BWPs occupy separate sets of RBs. After a UE transitions from the RRC_CONNECTED state to the RRC_INACTIVE state a single DL BWP is used by the UE which is identified as the INACTIVE DL BWP 430. In this instance, the INACTIVE DL BWP 430 occupies a same set of RBs as the last active DL BWP 420, which does not overlap with the set of RBs occupied by CORESET 0 410.

Figure 4B:
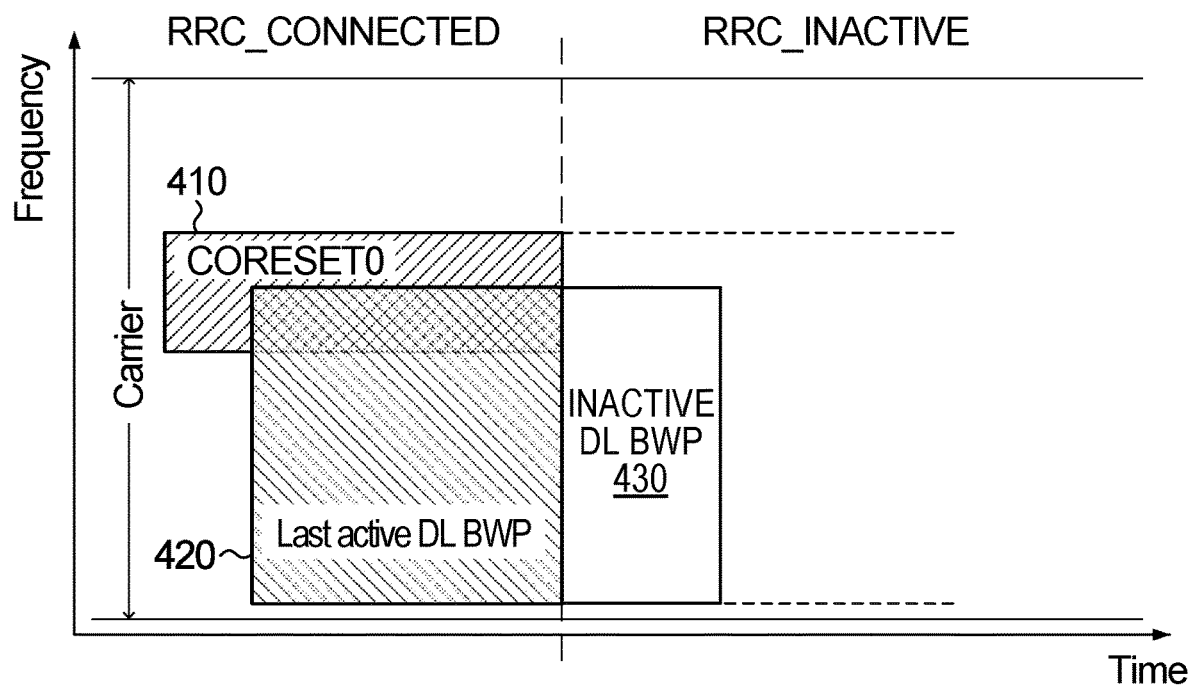

In FIG. 4B, CORESET 0 410 and a last active DL BWP 420 are shown in the portion of time indicated to be in the RRC_CONNECTED state. The two BWPs partially overlap in frequency. After a UE transitions from the RRC_CONNECTED state to the RRC_INACTIVE state, the INACTIVE DL BWP 430 is shown to occupy a same set of RBs as the last active DL BWP 420, which has some overlap with the set of RBs occupied by CORESET 0 410.

Figure 4C:
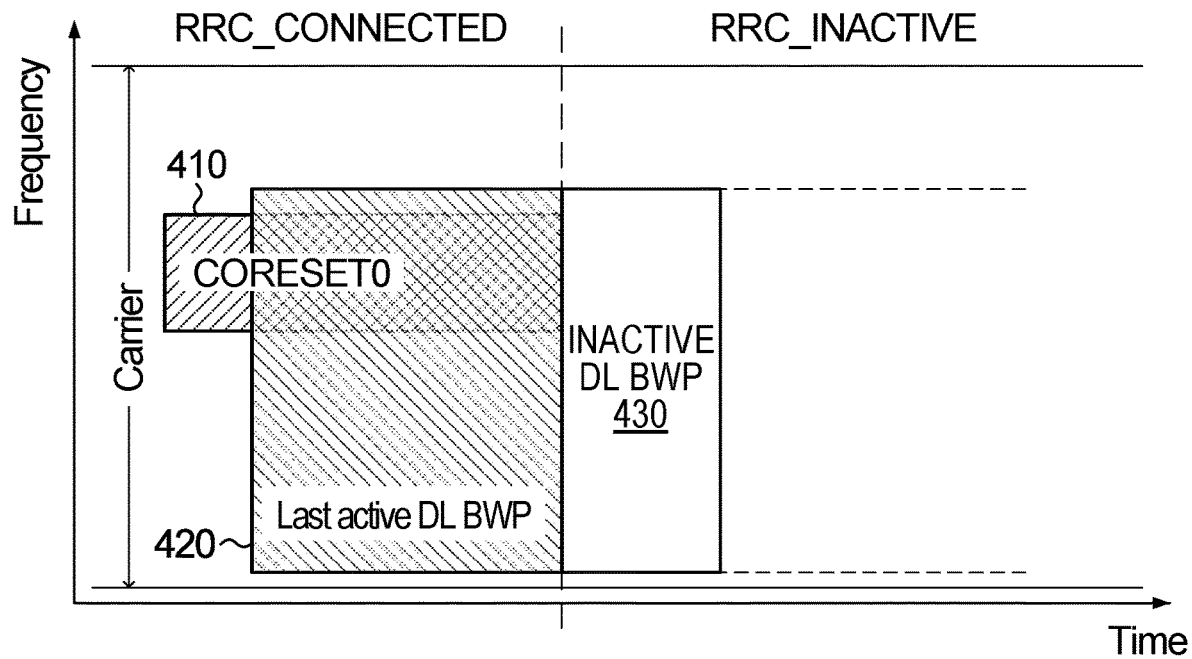

In FIG. 4C, CORESET 0 410 and a last active DL BWP 420 are shown in the portion of time indicated to be in the RRC_CONNECTED state. The last active DL BWP 420 includes an entire set of RBs of CORESET 0 410. After a UE transitions from the RRC_CONNECTED state to the RRC_INACTIVE state, the INACTIVE DL BWP 430 is shown to occupy a same set of RBs as the last active DL BWP 420, which totally overlaps with the set of RBs occupied by CORESET 0 410.

Figure 4D:
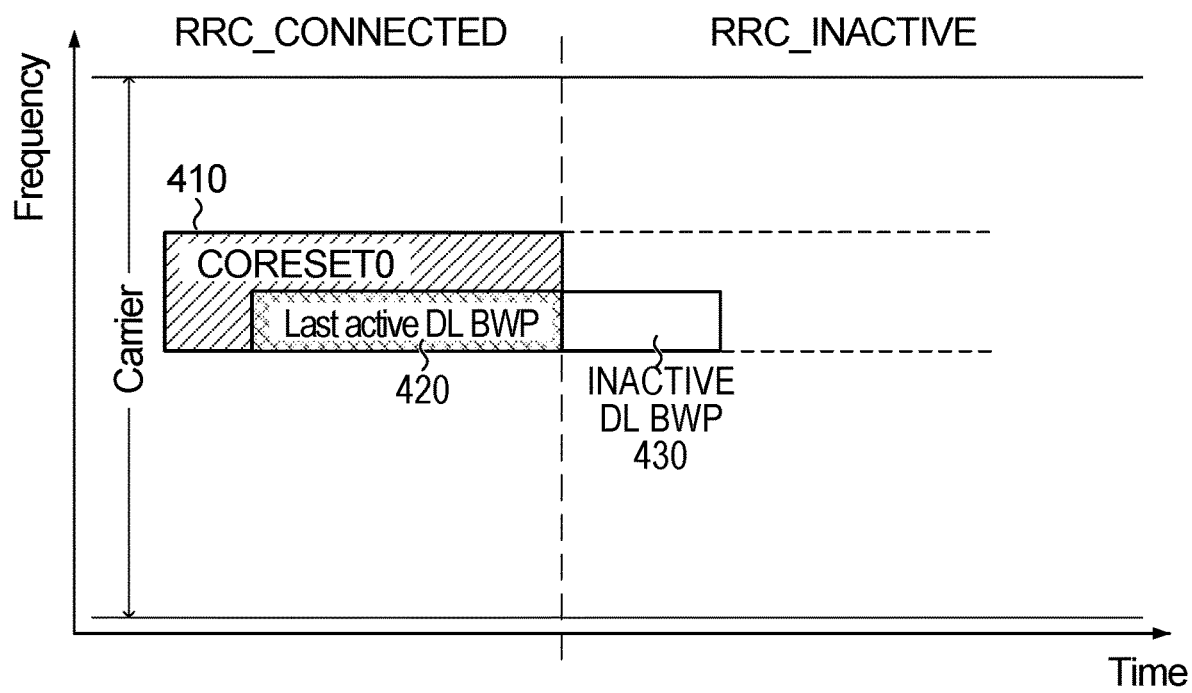

In FIG. 4D, CORESET 0 410 and a last active DL BWP 420 are shown in the portion of time indicated to be in the RRC_CONNECTED state. The last active DL BWP 420 falls totally within a set of RBs of CORESET 0 410. After a UE transitions from the RRC_CONNECTED state to the RRC_INACTIVE state, the INACTIVE DL BWP 430 is shown to occupy a same set of RBs as the last active DL BWP 420, which is within the set of RBs occupied by CORESET 0 410.

In a fourth example, an UL BWP used for the RRC_INACTIVE state is based on the last active UL BWP of the UE before transitioning to the RRC_INACTIVE state.

Some embodiments of the disclosure provide a configuration for a Cell-specific INACTIVE DL BWP or Cell-specific INACTIVE UL BWP for the RRC_INACTIVE state.

In a first example, CORESET 0, i.e. a set of contiguous RBs, starting from an RB with the lowest index and ending at an RB with the highest index among RBs of CORESET 0 is configured as a Cell-specific INACTIVE DL BWP. In a further example, a set of contiguous RBs of a CORESET for Type0-PDCCH CSS set can be configured as a Cell-specific INACTIVE DL BWP.

In a second example, the initial DL or UL BWP used by the UE when the UE is in the RRC_CONNECTED state is used as a Cell-specific INACTIVE DL or UL BWP in the RRC_INACTIVE state.

In a third example, the INACTIVE DL or UL BWP for the RRC_INACTIVE state is configured in system information block (SIB1), i.e. in servingCellConfigCommonSIB. For example, the INACTIVE DL or UL BWP for the RRC_INACTIVE state in the RRC information element DownlinkConfigCommonSIB or UplinkConfigCommonSIB in servingCellConfigCommonSIB.

In a fourth example, the INACTIVE DL or UL BWP for the RRC_INACTIVE state is configured in a new system information block (SIBx) which is particularly used for configurations related to data transmission in RRC_INACTIVE, where≠1 is an integer.

Embodiment 1-1

In some embodiments, further restrictions may be placed on the location and bandwidth of INACTIVE BWP. Such further restrictions may limit flexibility so as to avoid RF retuning by a UE in the RRC_INACTIVE state.

In some embodiments, an INACTIVE DL BWP includes all RBs of CORESET 0. FIG. 4C is also a representative example of this particular situation.

In some embodiments, an INACTIVE UL BWP includes all RBs of the initial UL BWP.

Embodiment 1-2

In some embodiments, further restrictions may be placed on sub-carrier spacing (SCS) and cyclic prefix (CP) parameters of the INACTIVE BWP. A possible benefit of these embodiments is to avoid a numerology change by a UE in the RRC_INACTIVE state, and thus, limit the complexity of operation of the UE and/or UE implementation in RRC_INACTIVE state.

In some embodiments, an INACTIVE DL BWP has a same SCS and a same CP as CORESET 0. In an example, i.e. an INACTIVE DL BWP has the same SCS and CP as a SCS and a CP for physical downlink control channel (PDCCH) reception in the CORESET for Type0-PDCCH CSS set.

In some embodiments, an INACTIVE UL BWP has a same SCS and a same CP as the initial UL BWP.

Embodiment 2-1

Some embodiments of the present disclosure provide a reinterpretation of generic BWP parameters for application to BWP to be used in the RRC_INACTIVE state.

One particular example is reinterpretation of CP length. A particular use for reinterpretation of the CP length may be for an UL BWP in the RRC_INACTIVE state.

In some embodiments, when an extended CP length is indicated in a BWP configuration, the following interpretation may be used by the UE. A normal CP with that SCS is used for the BWP when the UE is in the RRC_CONNECTED state and an extended CP with that SCS is used for the BWP when the UE is in the RRC_INACTIVE state. In an example, the mentioned interpretation may only be applicable when the SCS is not 60 kHz.

In some embodiments, an extended CP length is always used with the configured SCS in the RRC_INACTIVE state, regardless of the CP length configuration of the SCS in the RRC_CONNECTED state.

The above described embodiments pertaining to CP length may be applicable to any of the BWP configuration alternatives in Embodiments 1-0, 1-1 and 1-2

In some embodiments, new extended CP values are defined for various SCS. In some embodiments, the extended CP values may be used for SCS where extended CP values have not been previously defined, i.e. other than 60 kHz. A particular example may be that an extended CP is indicated in the configuration of the initial UL BWP. For example, an extended CP for a particular SCS is determined such that a number of OFDM symbols per slot of the SCS with the extended CP is equal to 12, whereas a number of OFDM symbols per slot of the SCS with a normal CP is equal to 14. A particular example of the extended CP for the SCS is a CP length which is equal to 25% of an OFDM symbol duration corresponding to the SCS, with the OFDM symbol duration being equal to a reciprocal of the SCS value.

Embodiment 2-2

Another particular example of reinterpretation of a generic parameter is reinterpretation of bandwidth and location of a BWP. There is somewhat limited flexibility of reinterpreting these parameters so as to avoid RF retuning by a UE in the RRC_INACTIVE state.

In some embodiments, in the case of a UE-specific INACTIVE DL BWP, if the UE-specific INACTIVE DL BWP does not include all RBs of CORESET 0, the DL BWP to be used in the RRC_INACTIVE state can be defined by the RBs spanned by the UE-specific INACTIVE DL BWP and CORESET 0.

FIGS. 5A to 5C and FIG. 4C illustrate four different examples of the configured INACTIVE DL BWP following a transition from the RRC_CONNECTED state to RRC_INACTIVE state. In each of the figures the horizontal axis corresponds to time, increasing form left to right and the vertical axis corresponds to frequency. The various blocks shown in the figures represent frequency resources of different BWPs.

Figure 5A:
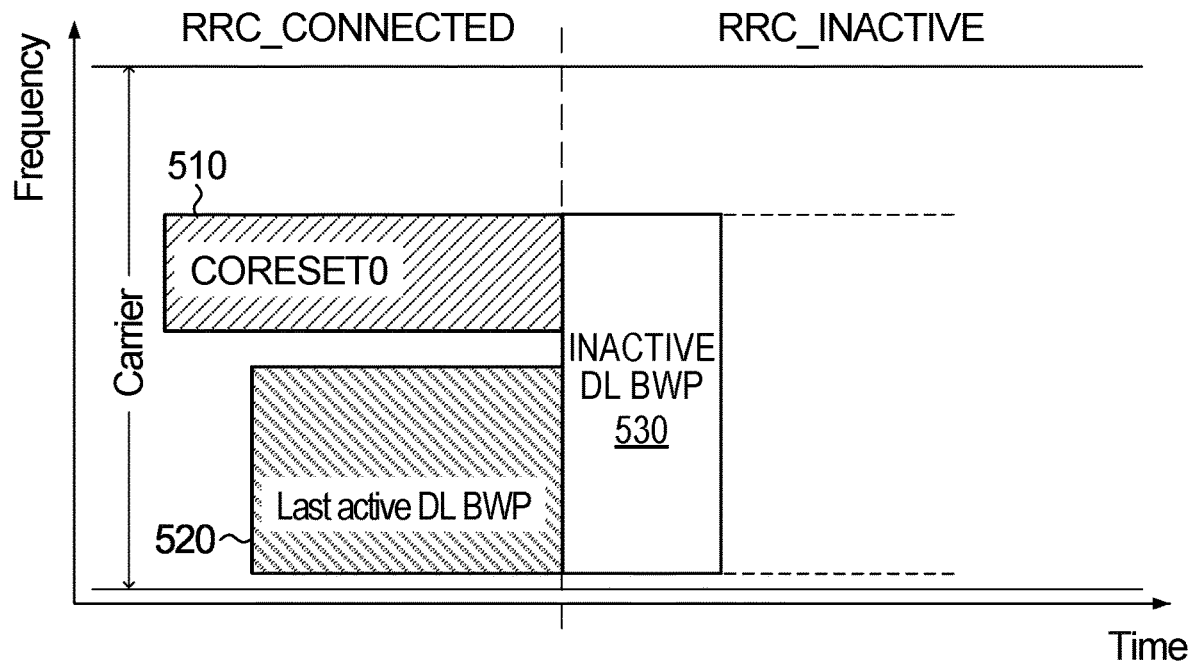
FIGS. 5A to 5C illustrate four different examples of the configured INACTIVE DL BWP following a transition from the RRC_CONNECTED state to RRC_INACTIVE state, according to aspects of the present disclosure.

In FIG. 5A, two transmission resources are shown in the portion of time indicated to be in the RRC_CONNECTED state. A first BWP is CORESET 0 510, or more particularly, a set of contiguous RBs of CORESET 0 510. A second BWP is a last active DL BWP 520. The two BWPs occupy separate sets of RBs. After a UE transitions from the RRC_CONNECTED state to the RRC_INACTIVE state a single BWP is used by the UE which is identified as the INACTIVE DL BWP 530. In this instance, the INACTIVE DL BWP 530 occupies a set of RBs that encompasses a set of RBs of the last active DL BWP 520, occupies the set of RBs of CORESET 0 510 and the RBs separating the two BWPs 510 and 520.

Figure 5B:
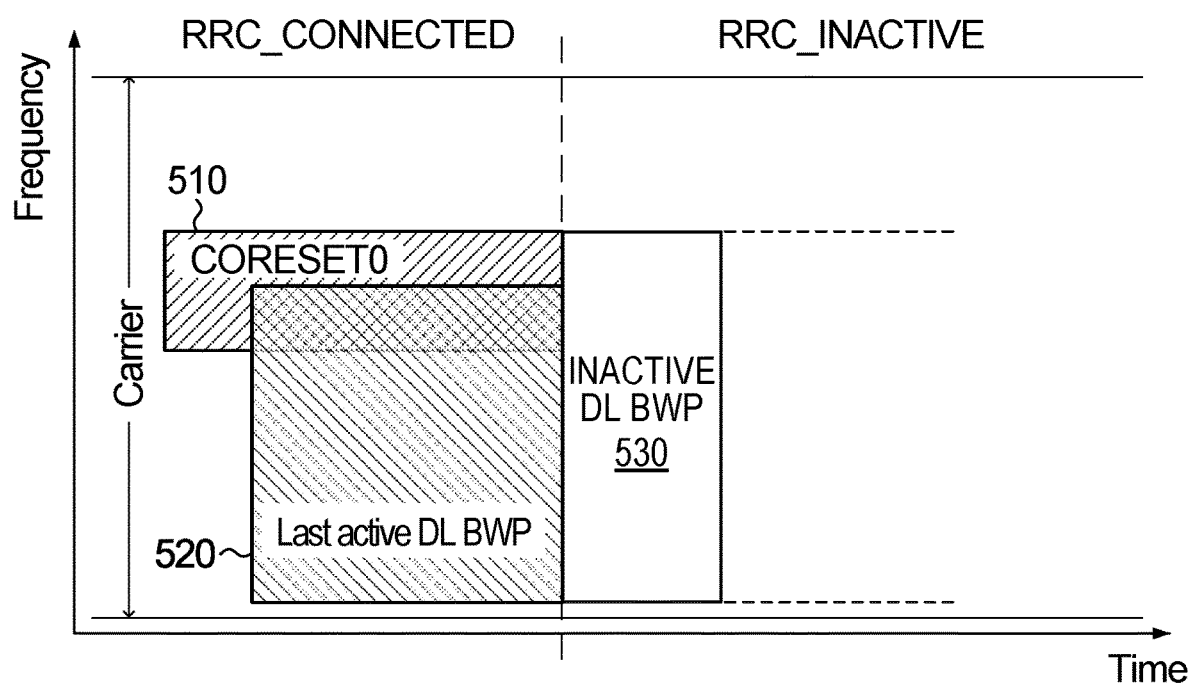

In FIG. 5B, CORESET 0 510 and a last active DL BWP 520 are shown in the portion of time indicated to be in the RRC_CONNECTED state. The BWPs 510 and 520 partially overlap in frequency. After a UE transitions from the RRC_CONNECTED state to the RRC_INACTIVE state, the INACTIVE DL BWP 530 is shown to occupy a set of RBs that encompasses the last active DL BWP 520 and the RBs of CORESET 0 510.

Figure 5C:
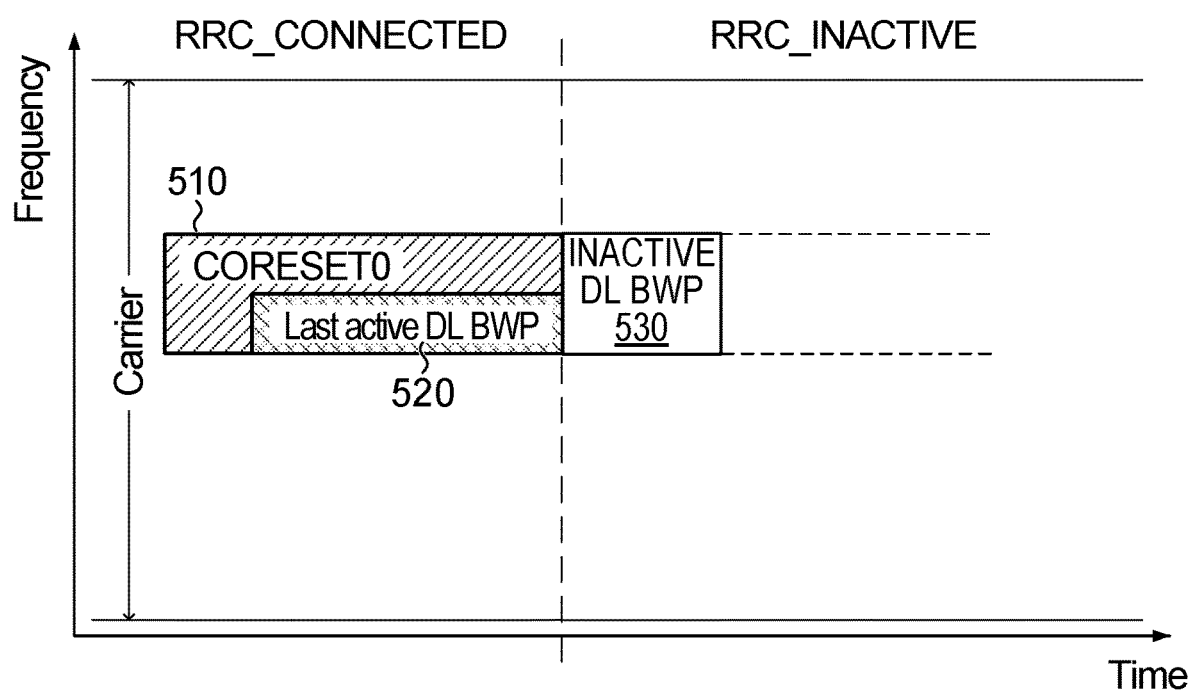

In FIG. 5C, CORESET 0 510 and a last active DL BWP 520 are shown in the portion of time indicated to be in the RRC_CONNECTED state. A set of RBs of the last active DL BWP 520 falls totally within a set of RBs of CORESET 0 510. After a UE transitions from the RRC_CONNECTED state to the RRC_INACTIVE state, the INACTIVE DL BWP 530 is shown to occupy a set of RBs that encompasses CORESET 0 510, which also encompasses the set of RBs of the last active DL BWP 520.

Referring again to FIG. 4C, CORESET 0 410 and the last active DL BWP 420 are shown in the portion of time indicated to be in the RRC_CONNECTED state. The last active DL BWP 420 occupies the entire set of RBs of CORESET 0 410. After a UE transitions from the RRC_CONNECTED state to the RRC_INACTIVE state, the INACTIVE DL BWP 430 is shown to occupy a set of RBs that encompasses the last active DL BWP 420, which also encompasses the RBs of CORESET 0 410.

In some embodiments, in the case of a UE-specific INACTIVE UL BWP, if the UE-specific INACTIVE UL BWP does not include all resource blocks of the initial UL BWP, the UL BWP to be used in the RRC_INACTIVE state can be defined by the RBs spanned by the UE-specific INACTIVE UL BWP and the initial UL BWP.

Some aspects of the present disclosure pertain to implicit DL BWP switching in RRC_INACTIVE state. In some embodiments, there is no BWP ID indication in the scheduling command for such switching.

Embodiment 3-1

In some embodiments, DL BWP switching is always assumed for DL unicast/multicast transmission in the RRC_INACTIVE state.

In some embodiments, DL BWP switching is assumed for DL unicast/multicast transmission in the RRC_INACTIVE state only when a condition is met. Several examples of the DL BWP switching condition, which are intended to be non-limiting, are included below.

In a first condition, the INACTIVE DL BWP has a different frequency location and bandwidth or a different SCS or a different CP length than the CORESET 0.

In a second condition, the INACTIVE DL BWP does not include all RBs of CORESET 0 or, has a different SCS or a different CP than CORESET 0.

In some embodiments, UL BWP switching is always assumed for UL transmission in the RRC_INACTIVE state.

In some embodiments, UL BWP switching is assumed for UL transmission in the RRC_INACTIVE state only when a condition is met. Several examples of the UL BWP switching condition, which are intended to be non-limiting, are included below.

In a first condition, the INACTIVE UL BWP has a different frequency location and bandwidth or a different SCS or a different CP length than the initial UL BWP.

In a second condition, the INACTIVE UL BWP does not include all RBs of the initial UL BWP or, has a different SCS or a different CP than the initial UL BWP.

Figure 6A:
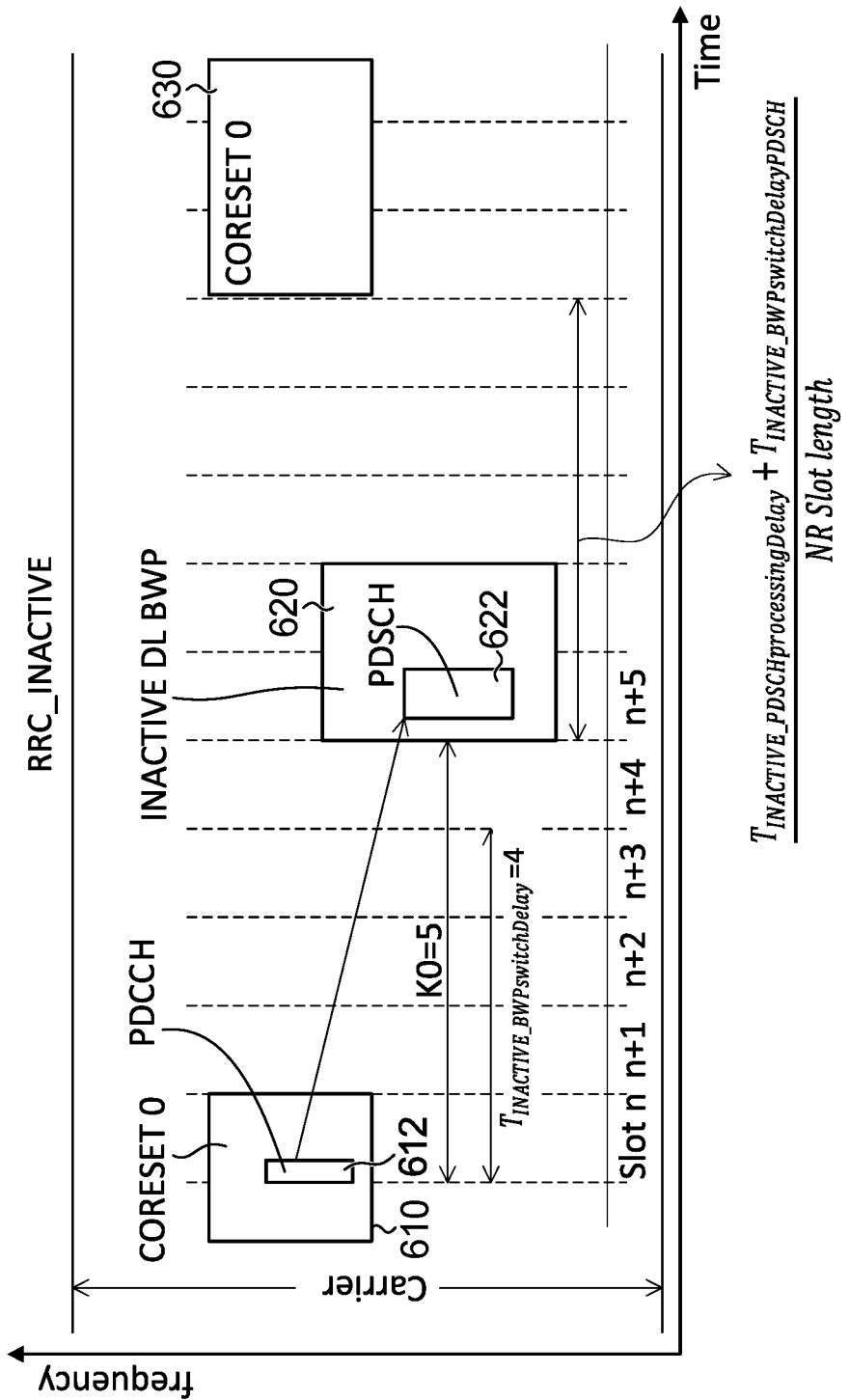
FIG. 6A illustrates an example of when a condition for DL BWP switching is met in the RRC_INACTIVE state, according to aspects of the present disclosure.

FIG. 6A illustrates an example of when a condition for DL BWP switching is met in the RRC_INACTIVE state, for example with respect to the second condition. In FIG. 6A, the horizontal axis corresponds to time, increasing from left to right and the vertical axis corresponds to frequency. The various blocks shown in the figure represent DL BWPs. A first DL BWP is CORESET 0 610, which is shown to include a PDCCH 612. A second DL BWP is an INACTIVE DL BWP 620, which is shown to include a PDSCH 622. A further occurrence of CORESET 0 630 is also shown in the figure.

In FIG. 6A, the condition for switching is met because the INACTIVE DL BWP 620 does not include all RBs of CORESET 0 610. Because the INACTIVE DL BWP 620 does not include all RBs of CORESET 0 610, a proper value of K0 i.e. K0=5, which is greater than the switching delay, is used by the base station because the base station also knows that the switching condition is met, and the base station should allow enough time to the UE to perform the switching. K0 indicates an offset (for example in number of slots) between a slot where PDCCH that contains the DCI is received and a slot where the PDSCH is scheduled.

Figure 6B:
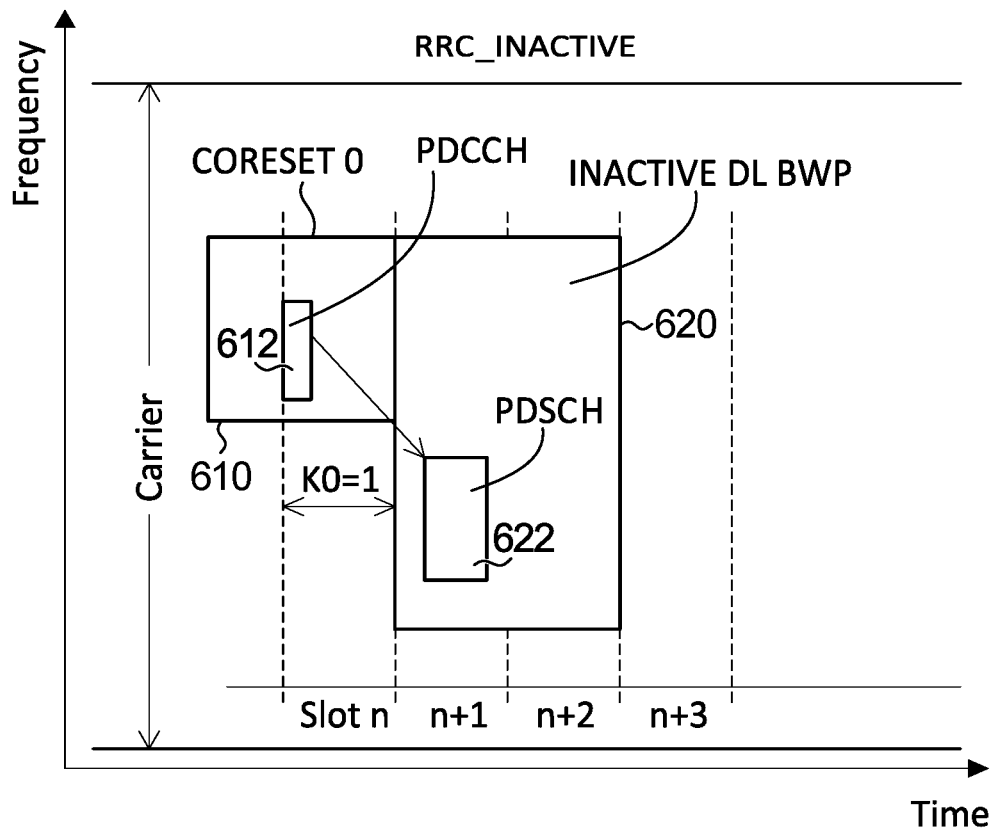
FIG. 6B illustrates an example of when a condition for DL BWP switching is not met in the RRC_INACTIVE state, according to aspects of the present disclosure.

FIG. 6B illustrates an example of when a condition for DL BWP switching is not met in the RRC_INACTIVE state, for example with respect to the second condition. In FIG. 6B, the horizontal axis corresponds to time, increasing from left to right and the vertical axis corresponds to frequency. A first DL BWP is CORESET 0 610, which is shown to include a PDCCH 612. A second DL BWP is an INACTIVE DL BWP 620, which is shown to include a PDSCH 622.

In FIG. 6B, the condition for switching is not met because the INACTIVE DL BWP 620 includes all RBs of CORESET 0 610.

A switching delay that defines the delay between switching from one BWP to another BWP may be applied. In some embodiments, such a switching delay may be based on a value set out in a telecommunications standard document.

Embodiment 3-2

In some embodiments, a UE is provided with a predetermined delay, called BWP switching delay, to accommodate switching of DL (or UL BWP), before receiving DL data in the RRC_INACTIVE state (or transmitting UL data in the RRC_INACTIVE state). In some embodiments, the BWP switching delay may be set forth in a telecommunications standard document. A possible benefit of these embodiments is to provide enough time for the UE to perform operations that are necessary for the UE to switch its DL (or UL BWP) in RRC_INACTIVE state.

Two examples of DL scheduling are DCI based DL scheduling and paging based DL scheduling.

Figure 7:
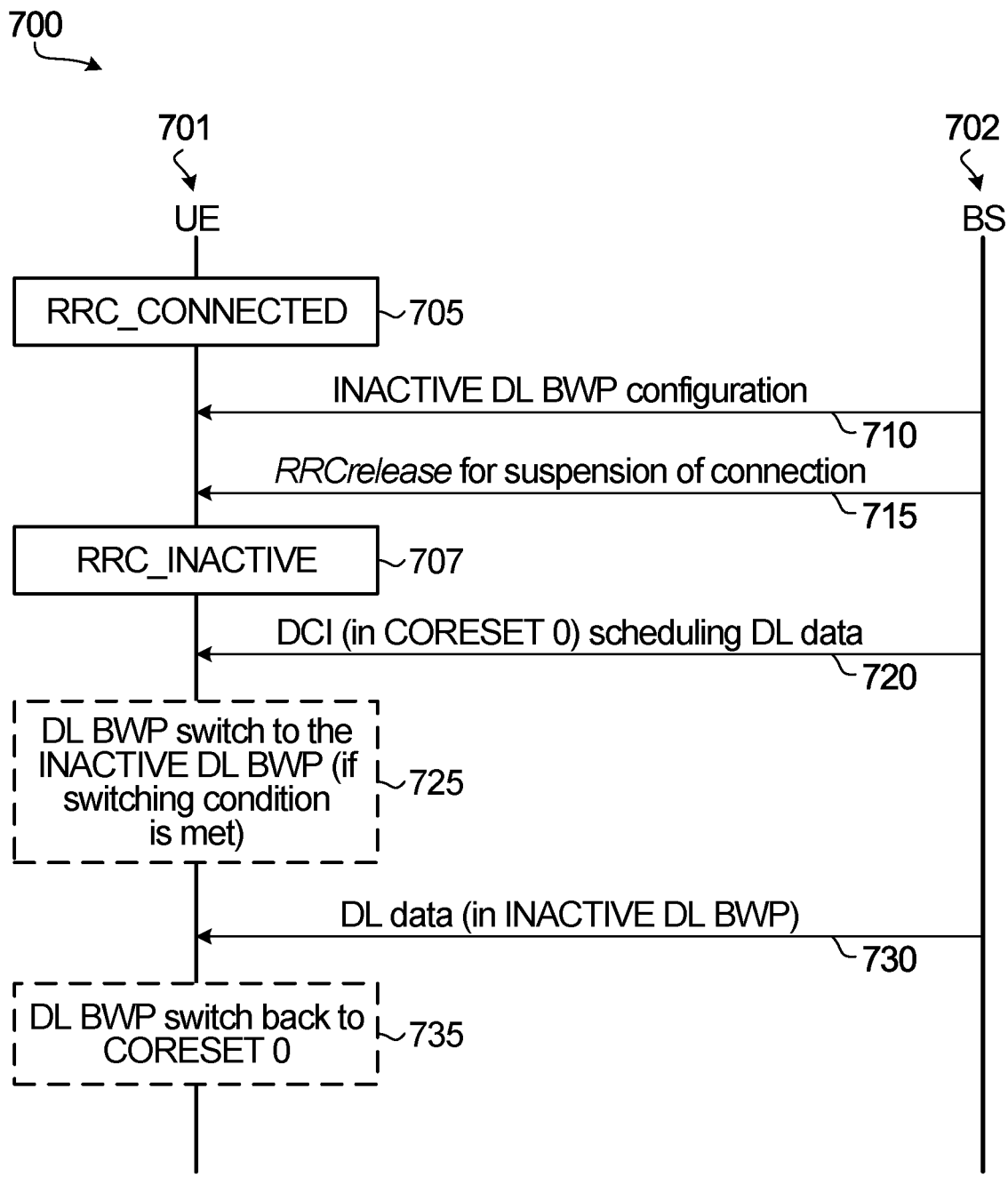
FIG. 7 is a signaling flow diagram showing signaling for DCI-based DL data scheduling that occurs between a UE and base station when the UE is initially in an RRC_CONNECTED state and when the UE is released and enters an RRC_INACTIVE state, according to aspects of the present disclosure.

FIG. 7 is a signaling flow diagram 700 showing signaling for DCI-based DL data scheduling that occurs between a UE 701 and base station 702 when the UE 701 is initially in an RRC_CONNECTED state 705 and then the UE 701 is released and enters an RRC_INACTIVE state 707.

Initially the UE 701 is in the RRC_CONNECTED state 705. The base station 702 sends 710 an INACTIVE DL BWP configuration to the UE 701. At a subsequent point in time, the base station 702 sends 715 an RRCrelease for suspension of connection to the UE 701. After receiving the release, the UE 701 transitions to the RRC_INACTIVE state 707. While the UE is in the RRC_INACTIVE state 707, the base station 702 sends 720 a DCI in CORESET 0 scheduling DL data. Upon receipt of the DCI, the UE 701 switches 725 to an INACTIVE DL BWP, if a switching condition is met. The base station 702 sends 730 DL data in the INACTIVE DL BWP. Once the DL data has been received, the UE 801 switches 735 the DL BWP from INACTIVE DL BWP to CORESET 0, if the switching was performed in 725.

The UE 701 is in the inactive state when the DCI is received. In some instances, the DCI includes a CRC scrambled with a RNTI that is specific to the UE 701 and to the inactive state. A RNTI that is specific to a particular UE and to the inactive state is referred herein to as an "I-RNTI". Because the I-RNTI is specific to the inactive state, the I-RNTI is not used to scramble the CRC of DCI for a connected or idle state. In some implementations, the UE 701 is in the RRC_INACTIVE state and the DCI is in the DCI format 1_0. The DCI includes a CRC that is scrambled with the I-RNTI of the UE 701. The I-RNTI is different from a Paging RNTI (P-RNTI), and is not used to scramble the CRC of DCI when the UE 701 is in the RRC_CONNECTED or RRC_IDLE states.

A UE in an inactive state monitors for DCI having a CRC scrambled with its own I-RNTI. The UE stores its own I-RNTI, and therefore this UE is able to descramble the CRC, and use the CRC to check if decoding of the DCI was successful. Because an I-RNTI is specific to a particular UE, any other UEs in the same network or service area will have a different I-RNTI. The other UEs might not store the I-RNTI of the particular UE, and therefore the other UEs might not be able to descramble the CRC of the DCI.

The DCI includes a resource allocation in a resource allocation bit field for the data transmission. In this way, the DCI could be or include a notification of data scheduling.

Based on the resource allocation, the UE 701 could receive the scheduled data transmission on the PDSCH. The UE 701 is in the inactive state when the data transmission is received. The data transmission could be a unicast transmission or a multicast transmission.

Paging messages can be used by a network to facilitate a UE transition to a connected state from an idle state or from an inactive state. The paging messages can be received over a paging physical DL shared channel (paging PDSCH), for example. The network initiates a paging procedure by transmitting a paging message at a UE's paging occasion. The network may address multiple UEs using a single paging message by including multiple UE identities (IDs) in a paging record that is carried by the paging message. A paging record is a set of UE IDs that correspond to UEs being paged by the network. In 3GPP NR Specification #TS38.331, an example of a paging record is the PagingRecord parameter and an example of a UE ID is the UE-Identity parameter.

According to an aspect of the present disclosure, a unicast or multicast data transmission to or from a UE in an inactive state is scheduled through paging. The UE can be notified of the data transmission using an indication in paging DCI or in a paging message. The data transmission can then be received in the paging message or in a further transmission that is scheduled by the paging message.

In some embodiments, a UE in an idle or inactive state monitors a paging search space for a physical DL control channel (PDCCH) containing paging DCI. An example of paging DCI in NR is DCI format 1_0 having a cyclic redundancy check (CRC) scrambled or masked with the P-RNTI. UEs in an idle or inactive state know the P-RNTI, and therefore these UEs are able to descramble or demask the CRC, and use the CRC to check if decoding of the DCI format 1_0 was successful. The DCI format 1_0 includes, among other information, either or both of a short message and scheduling information for a paging message. The scheduling information for the paging message could include a resource assignment with a frequency domain resource assignment, a time domain resource assignment, a virtual resource block (VRB)-to-physical resource block (PRB) mapping, a modulation and coding scheme (MCS), and/or transport block (TB) scaling. By way of example, DCI format 1_0 having a CRC scrambled by the P-RNTI could include any or all of the following bit fields:

Short message indicator—2 bits in length;
Short message—8 bits in length;
Frequency domain resource assignment for a paging message—$[\log_2(N_{RB}^{DL,BWP}(N_{RB}^{DL,BWP}+1)/2)]$ bits in length, where $N_{RB}^{DL,BWP}$ could be equal to the size of the control resource set (CORESET) 0 (if only the short message is carried, then this bit field is reserved);
Time domain resource assignment for the paging message—4 bits in length (if only the short message is carried, this bit field is reserved);
VRB-to-PRB mapping for the paging message—1 bit in length (if only the short message is carried, this bit field is reserved);

MCS for the paging message—5 bits in length (if only the short message is carried, this bit field is reserved);

TB scaling for the paging message—2 bits in length (if only the short message is carried, this bit field is reserved); and Reserved bits—6 bits in length.

In the case that paging DCI contains a resource allocation for a paging message, a UE that receives the paging DCI proceeds to receive the scheduled paging message based on the resource allocation. When a UE in an idle state receives a paging message, the UE may determine if any of the UE IDs included in each paging record of the paging message match the particular ID allocated to the UE by upper layers of the network. In NR, 5G-S-TMSI is used as the UE ID for paging a UE in RRC_IDLE state. In the case that a UE ID in a paging record matches the particular ID of the UE, then the UE may initiate a connection to the network, i.e. transition to a connected state, by forwarding the UE's particular ID and an access type, if present, to the upper layers. An access type for a UE may be included as the accessType parameter be included in 3GPP NR Specification #TS38.331.

When a UE in an inactive state receives a paging message, the UE may determine if the UE ID included in each paging record of the paging message matches the UE's stored FuIII-RNTI. The FuIII-RNTI is a 40-bit string that is configured to the UE during an RRC suspension procedure. For example, according to 3GPP NR Specification #TS38.331, the FuIII-RNTI could be configured in the SuspendConfig field of an RRCRelease information element (IE), which is configured to the UE for suspension of the RRC connection and transition of the UE from the RRC_CONNECTED state to RRC_INACTIVE state.

Conventional control signaling mechanisms do not support (non-paging) DL data transmission to a UE or data transmission from a UE in an inactive state, except for transmissions that are done as part of state transition procedure from an inactive to connected state. According to these conventional control signaling mechanisms, when a UE is in an inactive state and is not performing a procedure for connection resumption, the only DCI format that the UE monitors is the paging DCI. For example, the only DCI format that a UE in the RRC_INACTIVE state monitors is DCI format 1_0 having a CRC scrambled by the P-RNTI. However, a conventional paging DCI does not support:

non-paging DL data scheduling;
notifications for non-paging DL data scheduling;
SL data scheduling; or
UL data scheduling.

Figure 8:
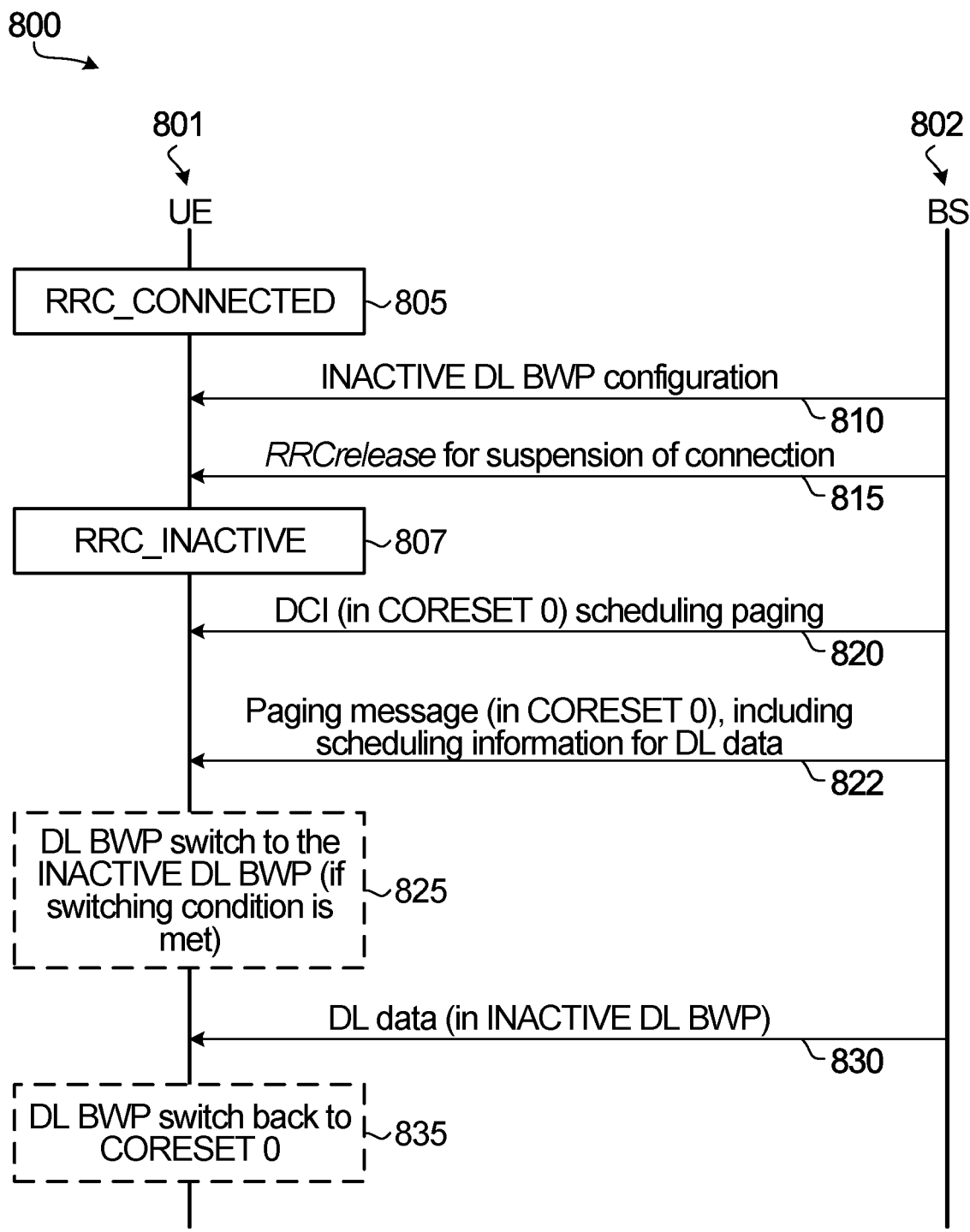
FIG. 8 is a signaling flow diagram showing signaling for paging-based DL data scheduling that occurs between a UE and base station when the UE is initially in an RRC_CONNECTED state and when the UE is released and enters an RRC_INACTIVE state, according to aspects of the present disclosure.

FIG. 8 is a signaling flow diagram 800 showing signaling for paging-based DL data scheduling that occurs between a UE 801 and base station 802 when the UE 801 is initially in an RRC_CONNECTED state 805 and then the UE 801 is released and enters an RRC_INACTIVE state 807.

Initially the UE 801 is in the RRC_CONNECTED state 805. The base station 802 sends 810 an INACTIVE DL BWP configuration to the UE 801. At a subsequent point in time the base station 802 sends 815 an RRCrelease for suspension of connection to the UE 801. After receiving the release the UE 801 transitions to the RRC_INACTIVE state 807. While the UE 801 is in the RRC_INACTIVE state 807, the base station 802 sends 820 a DCI in CORESET 0 scheduling paging. The base station 802 then sends 822 a paging message in CORESET 0 that includes scheduling information for DL data. Upon receipt of the paging message, the UE 801 switches 825 to an INACTIVE DL BWP, if a switching condition is met. The base station 802 sends 830 DL data in the INACTIVE DL BWP. Once the DL data has been received, the UE 801 switches 835 the DL BWP from INACTIVE DL BWP to CORESET 0, if the switching was performed in 825.

Figure 9:
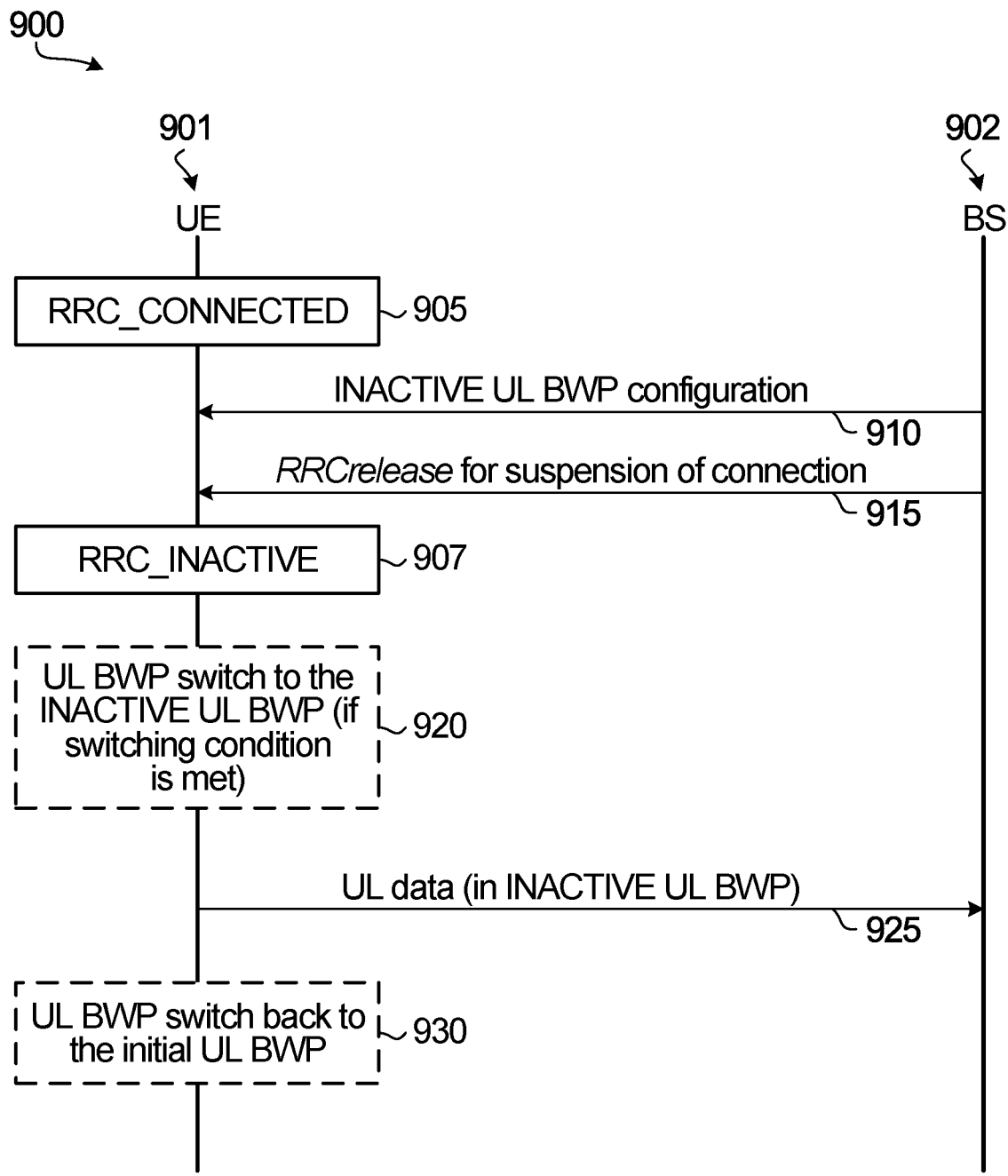
FIG. 9 is a signaling flow diagram showing signaling for UL data transmission in an INACTIVE UL BWP that occurs between a UE and base station when the UE is initially in an RRC_CONNECTED state and when the UE is released and enters an RRC_INACTIVE state, according to further aspects of the present disclosure.

FIG. 9 is a signaling flow diagram 900 showing signaling for UL data transmission in an INACTIVE UL BWP that occurs between a UE 901 and base station 902 when the UE 1001 is initially in an RRC_CONNECTED state 905 and then the UE 901 is released and enters an RRC_INACTIVE state 907.

Initially the UE 901 is in the RRC_CONNECTED state 905. The base station 902 sends 910 an INACTIVE UL BWP configuration to the UE 901. At a subsequent point in time the base station 902 sends 915 an RRCrelease for suspension of connection to the UE 901. After receiving the release the UE 901 transitions to the RRC_INACTIVE state 907. While the UE is in the RRC_INACTIVE state 907, the UE 901 switches 920 to an INACTIVE UL BWP, if a switching condition is met. The UE 901 sends 925 UL data in the INACTIVE DL BWP. Once the DL data has been sent, the UE 901 switches 930 the UL BWP from INACTIVE UL BWP to the Initial BWP, if the switching was performed in 920.

In the case of DCI based DL scheduling, a UE may obtain the resource assignment (RA) by decoding a DCI received in a PDCCH. A starting time for BWP switching may be the end of $k^{th}$ symbol of slot n containing the PDCCH. The value of k may be predefined, e.g. k=3 or the value may be configured by higher layers.

If a UE detects a DCI in a PDCCH which schedules unicast/multicast PDSCH for the UE in the RRC_INACTIVE state and the DL BWP switching condition in the RRC_INACTIVE state is met, the UE is not required to receive or transmit in the cell during a time duration from the end of the $k^{th}$ symbol of a slot where the UE receives the PDCCH until the beginning of a slot indicated by the slot offset value of the time domain resource assignment field in the DCI.

If a UE detects a DCI in a PDCCH which schedules unicast/multicast PUSCH for the UE in the RRC_INACTIVE state and the UL BWP switching condition in the RRC_INACTIVE state is met, the UE is not required to receive or transmit in the cell during a time duration from the end of the $k^{th}$ symbol of a slot where the UE receives the PDCCH until the beginning of a slot indicated by the slot offset value of the time domain resource assignment field in the DCI.

Therefore, if the switch to a new BWP occurs, the UE expects the corresponding PDSCH to be scheduled on or after the slot n plus the appropriate delay, i.e. $n+T_{INACTIVE\_BWPswitchDelay}$, where $T_{INACTIVE\_BWPswitchDelay}$ is defined in number of slots, and may be predefined or configured to the UE by higher layers.

The UE will behave in a particular manner for DCI-based DL scheduling, when the DL BWP switching condition in the RRC_INACTIVE state is met.

After the UE receives a DL scheduling PDCCH at DL slot n, the UE can receive PDSCH on the INACTIVE DL BWP on the first DL slot right after the beginning of DL slot $n+T_{INACTIVE\_BWPswitchDelay}$, where $T_{INACTIVE\_BWPswitchDelay}$ is the DL BWP switching delay in number of slots.

Referring back to the example of FIG. 6A, slot n is illustrated at the PDCCH 612 within CORESET 0 610 and the $T_{INACTIVE\_BWPswitchDelay}$ is shown to be 4 slots.

The UE, when in the RRC_INACTIVE state, does not expect a time domain resource assignment field providing a slot offset value for a PDSCH reception that is smaller than a predetermined delay used by the UE for DCI-based active DL BWP change. The time domain resource assignment field may be detected as part of the DCI format 1_0 having a CRC scrambled by I-RNTI. In the example of FIG. 6A, a time-domain resource assignment offset of K0 satisfies a DL BWP switching delay used by the UE for DCI-based active DL BWP change, because K0>$T_{INACTIVE\_BWPswitchDelay}$.

In the case of paging based DL scheduling, when the UE obtains the resource assignment by decoding the paging payload, the UE may need some time to process the paging transport block (TB) and obtain the resource assignment. A starting symbol/slot for BWP switching may be the first symbol of a slot n with $T_{PagingProcessingDelay}$ offset from the last slot n containing the DL scheduling command (i.e. paging TB) i.e.

$$n + \frac{T_{PagingProcessingDelay} + T_{INACTIVE\_BWPswitchDelayPaging}}{NR\ Slot\ length},$$

where $T_{PagingProcessingDelay}$ and $T_{INACTIVE\_BWPswitchDelayPaging}$ are in milliseconds.

The value of $T_{PagingProcessingDelay}$ may be predefined or configured to the UE by higher layers.

The UE will behave in a particular manner for Paging-based DL scheduling, when the DL BWP switching condition in the RRC_INACTIVE state is met.

After the UE receives a DL scheduling paging message, the UE may be able to receive PDSCH on the INACTIVE DL BWP on the first DL slot right after the beginning of DL slot $$n + \frac{T_{PagingProcessingDelay} + T_{INACTIVE\_BWPswitchDelayPaging}}{NR\ Slot\ length},$$

where the DL slot n is the last slot containing the paging message, $T_{PagingProcessingDelay}$ in milliseconds is the length of paging processing delay, and $T_{INACTIVE\_BWPswitchDelayPaging}$ in milliseconds is the time used by the UE to perform BWP switching in the RRC_INACTIVE state, and "NR Slot length" is the slot length in milliseconds of the numerology of the paging message or a larger value between that of a paging SCS and a SCS of the INACTIVE DL BWP.

The UE, when in the RRC_INACTIVE state, does not expect a time domain resource assignment field in a paging message that includes a slot offset value for a PDSCH reception that is smaller than a predetermined delay used by the UE for a paging-based active DL BWP change.

Embodiment 3-3

According to another aspect of the disclosure, there is provided a mechanism for autonomous DL BWP switching after receiving DL data in the RRC_INACTIVE state.

In some embodiments, the UE switches back to CORESET 0 after receiving the PDSCH.

A switching delay may be included for the autonomous switching. The switching delay is considered as an offset from the last slot n containing the DL PDSCH.

The switching delay may have components that include a PDSCH processing delay $T_{INACTIVE\_PDSCHprocessingDelay}$ and a DL BWP switching delay $T_{INACTIVE\_BWPswitchDelayPDSCH}$.

When the DL BWP switching condition in the RRC_INACTIVE state is met, after the UE receives DL PDSCH, the UE can receive PDSCH/PDCCH on CORESET 0 on the first DL slot right after the beginning of DL slot, i.e.

$$n + \frac{T_{INACTIVE\_PDSCHprocessingDelay} + T_{INACTIVE\_BWPswitchDelayPDSCH}}{NR\ Slot\ length},$$

where the DL slot n is the last slot containing the PDSCH, $T_{INACTIVE\_PDSCHprocessingDelay}$ in milliseconds is the length of PDSCH processing delay, and $T_{INACTIVE\_BWPswitchDelayPDSCH}$ in milliseconds is the time used by the UE to perform BWP switching in the RRC_INACTIVE state, and "NR Slot length" is the slot length in milliseconds of the numerology of PDSCH or the larger value between a PDSCH SCS and a SCS of CORESET 0.

Referring back to the example of FIG. 6A, a delay $$\frac{T_{INACTIVE\_PDSCHprocessingDelay} + T_{INACTIVE\_BWPswitchDelayPDSCH}}{NR\ Slot\ length}$$

is shown from the start of the INACTIVE DL BWP before switching back to CORESET 0 630.

If UE receives unicast or multicast PDSCH in the RRC_INACTIVE state, the UE does not expect to transmit or receive during a time duration equal to a delay required by the UE for an active DL BWP change after receiving PDSCH from the end of the last slot containing the PDSCH.

Although DL and UL transmissions are described above, the data transmission could instead be a SL transmission. A SL transmission could be transmitted or received by the UE on the physical SL shared channel (PSSCH).

Figure 10:
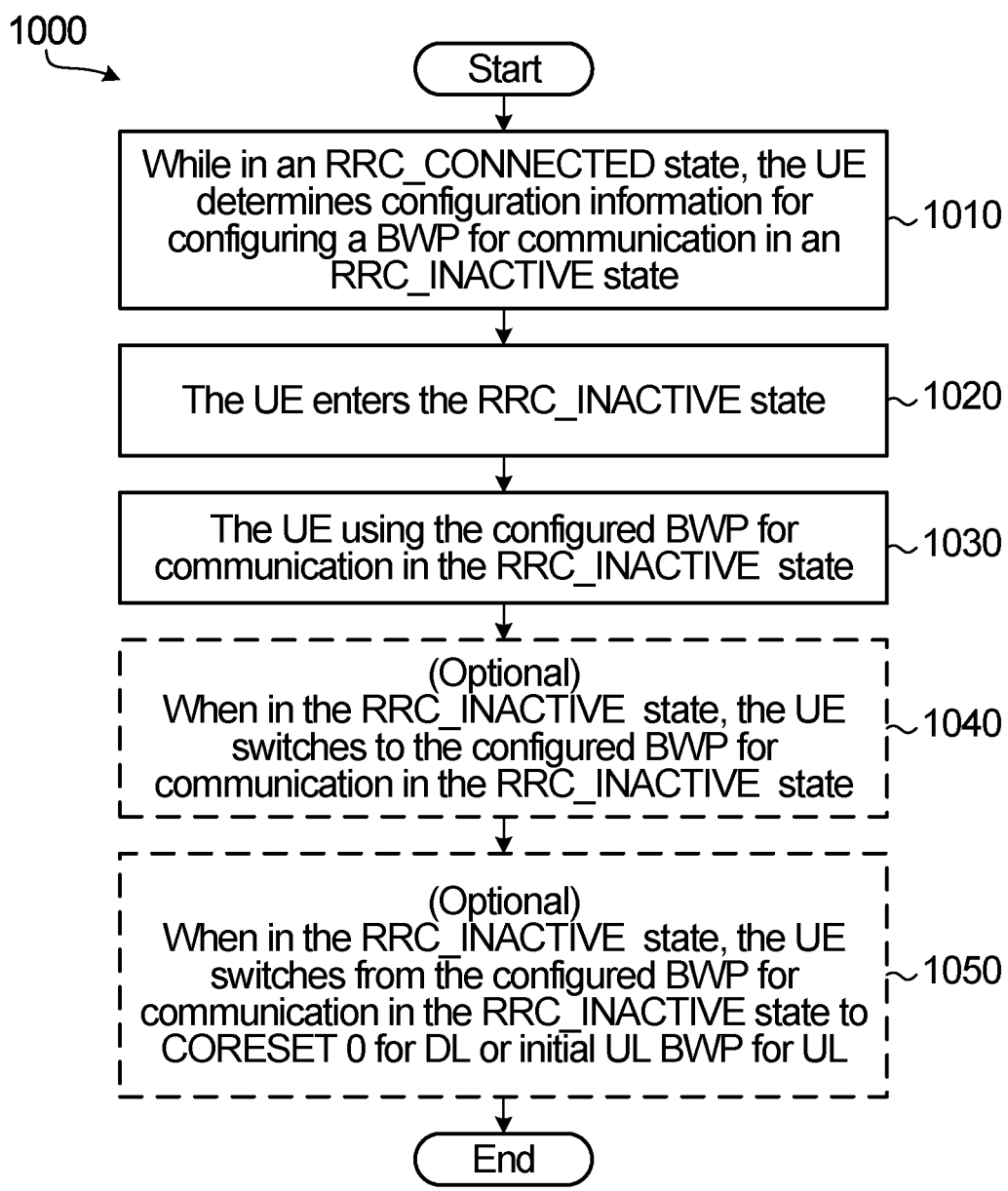
FIGS. 10 and 11 are flow diagrams illustrating methods according to aspects of the present disclosure.

FIG. 10 illustrates a flow chart 1000 for a method that may be used by a UE for downlink communications with a network device, uplink communications with a network device or sidelink communications with another UE.

At step 1010, while in a RRC_CONNECTED state, the UE determines configuration information for configuring a BWP for communication in a RRC_INACTIVE state. In some embodiments, determining configuration information may involve the UE making an implicit determination of how the UE should be configured based on information the UE is aware of. In some embodiments, the configuration information may be derived from information the UE is aware of by indicating that the configured BWP for downlink communication in the RRC_INACTIVE state is control resource set 0 (CORESET 0) or may indicate that the configured BWP is a last active BWP of the UE in the RRC_CONNECTED state before the UE enters the RRC_INACTIVE state. In some embodiments, the configuration information may be derived from information the UE is aware of by indicating that the configured BWP for uplink communication in the RRC_INACTIVE state is the initial UL BWP or may indicate that the configured BWP is a last active BWP of the UE in the RRC_CONNECTED state before the UE enters the RRC_INACTIVE state.

In some embodiments, the determining configuration information may involve the UE receiving explicit configuration information from the network regarding how the UE should be configured. In some embodiments, when received by the UE, the configuration information may explicitly define BWP parameters for the configured BWP for communication in the RRC_INACTIVE state. In some embodiments, when received by the UE, the configuration information may indicate a BWP identifier that identifies a previously configured BWP that will be used for communication in the RRC_INACTIVE state. In some embodiments, the configuration is received by the UE in ServingCellConfig parameter or in an RRCRelease message sent as part of a suspension of the active RRC connection. In some embodiments, the configuration is received by the UE in a system information block (SIB1) or a system information block other than SIB1 for transmission in the RRC_CONNECTED state (SIBx).

At step 1020, the UE enters the RRC_INACTIVE state. In some embodiments, this is the result of the UE receiving signalling indicating a suspension of the RRC_CONNECTED state.

At step 1030, the UE using the configured BWP for communication in the RRC_INACTIVE state.

Step 1040 is an optional step that includes, when in the RRC_INACTIVE state, the UE switching to the configured BWP for communication in the RRC_INACTIVE state. In some embodiments, the switching occurs when a pre-defined condition is met. The pre-defined condition may be one of: the configured BWP for communication in the RRC_INACTIVE state has a different frequency location and bandwidth or a different sub-carrier spacing (SCS) or a different cyclic prefix (CP) than CORESET 0; or the configured BWP for communication in the RRC_INACTIVE state does not include all resource blocks of CORESET 0 or has a different SCS or a different CP than CORESET 0. The pre-defined condition may be one of: the configured BWP for communication in the RRC_INACTIVE state has a different frequency location and bandwidth or a different sub-carrier spacing (SCS) or a different cyclic prefix (CP) than the initial UL BWP; or the configured BWP for communication in the RRC_INACTIVE state does not include all resource blocks of the initial UL BWP or has a different SCS or a different CP than the initial UL BWP.

In a further optional step 1050, when in the RRC_INACTIVE state, the UE switches from the configured BWP for communication in the RRC_INACTIVE state to CORESET 0 for DL or the initial UL BWP for UL.

Communication that may be received in the RRC_INACTIVE state may include downlink control information that includes scheduling information for further communications. In some embodiments, the scheduling information includes scheduling information for receiving downlink data while in the RRC_INACTIVE state. In some embodiments, the scheduling information includes scheduling information for transmitting uplink data while in the RRC_INACTIVE state.

In some embodiments, the configuration information for configuring the BWP for communication in the RRC_INACTIVE state includes an extended CP. The extended CP may be for an uplink BWP.

Figure 11:
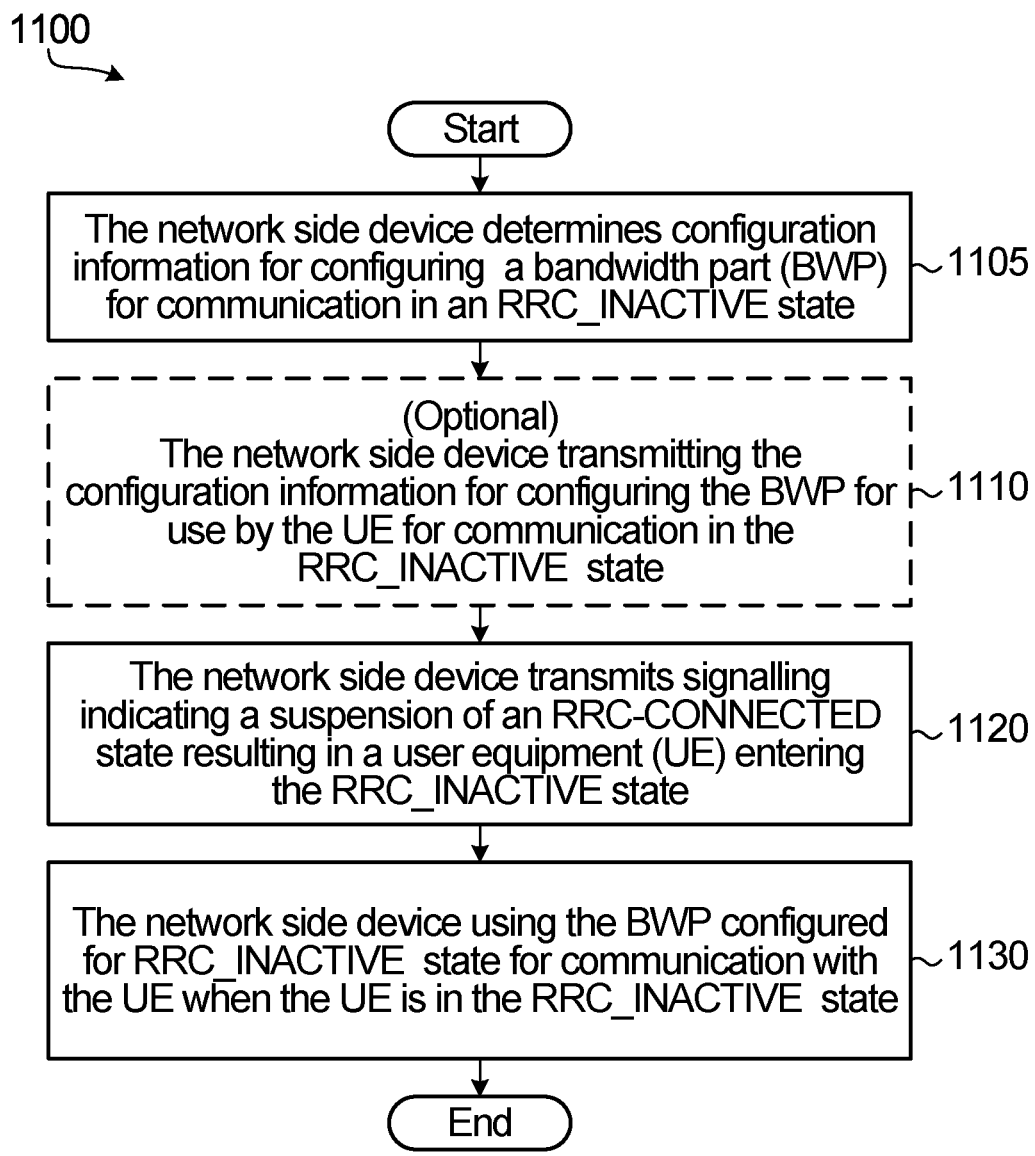

FIG. 11 illustrates a flow chart 1100 for a method that may be used by a network side device, such as a base station, for downlink communications with a UE or, uplink communications with a UE.

A first step 1105 includes the network side device determining configuration information for configuring a bandwidth part (BWP) for communication in an RRC_INACTIVE state. The network side device and the UE operate in conjunction, so the network side device determines the configuration information so that the UE will be properly configured to receive when the network side transmits. The network side device does not necessarily need to explicitly transmit the configuration information, as in optional step 1110 below, as the UE may be able to infer the configuration information as described in various example earlier in the description.

Step 1110, that may be considered optional, involves a network side device transmitting the configuration information for configuring the BWP for use by the UE for communication in the RRC_INACTIVE state. In some embodiments, the configuration information may include explicit configuration information from the network regarding how the UE should be configured. In some embodiments, the configuration information may explicitly define BWP parameters for the configured BWP for communication in the RRC_INACTIVE state. In some embodiments, the configuration information may indicate a BWP identifier that identifies a previously configured BWP that will be used for communication in the RRC_INACTIVE state. In some embodiments, the configuration is received by the UE in ServingCellConfig parameter or in an RRCRelease message sent as part of a suspension of the active RRC connection. In some embodiments, the configuration is received by the UE in a SIB1 or a SIBx other than SIB1.

At step 1120, the network side device transmits signalling indicating a suspension of an RRC_CONNECTED state resulting in the UE entering the RRC_INACTIVE state.

At step 1130, the network side device uses the configured BWP for RRC_INACTIVE state for communication with the UE when the UE is in the RRC_INACTIVE state.

Communication that may be received in the RRC_INACTIVE state may include downlink control information that includes scheduling information for further communications. In some embodiments, the scheduling information includes scheduling information for receiving downlink data while in the RRC_INACTIVE state. In some embodiments, the scheduling information includes scheduling information for transmitting uplink data while in the RRC_INACTIVE state.

In some embodiments, the configuration information for configuring the BWP for communication in the RRC_INACTIVE state includes an extended CP. The extended CP may be for an uplink BWP.

It should be appreciated that one or more steps of the embodiment methods provided herein may be performed by corresponding units or modules. For example, data may be transmitted by a transmitting unit or a transmitting module. Data may be received by a receiving unit or a receiving module. Data may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
   when in a radio resource control (RRC)_CONNECTED state, determining, by a user equipment (UE), configuration information for configuring an inactive uplink (UL) bandwidth part (BWP) for UL data communication in an RRC_INACTIVE state;
   receiving, by the UE, a control message that releases the UE from the RRC_CONNECTED state;
   entering, by the UE, into the RRC_INACTIVE state; and
   when in the RRC_INACTIVE state, configuring, by the UE, the inactive UL BWP based on the determined configuration information and using the configured inactive UL BWP for UL data communication.

2. The method of claim 1, wherein determining configuration information for configuring the inactive UL BWP for UL data communication in the RRC_INACTIVE state comprises receiving, by the UE, the configuration information for configuring the inactive UL BWP for UL data communication in the RRC_INACTIVE state.

3. The method of claim 2, wherein the configuration information explicitly defines BWP parameters for the configured inactive UL BWP for UL data communication in the RRC_INACTIVE state.

4. The method of claim 2, wherein the configuration information indicates a BWP identifier that identifies a previously configured UL BWP that will be used for UL data communication in the RRC_INACTIVE state.

5. The method of claim 1, wherein the configuration information indicates that the configured inactive UL BWP for UL data communication in the RRC_INACTIVE state is a last active UL BWP of the UE when in the RRC_CONNECTED state before the UE enters the RRC_INACTIVE state.

6. The method of claim 1 further comprising, when in the RRC_INACTIVE state, receiving, by the UE, downlink control information (DCI) that includes scheduling information.

7. The method of claim 1, wherein, when in the RRC_INACTIVE state, using the configured BWP for UL data communication comprises transmitting UL data using the configured inactive UL BWP for UL data communication.

8. The method of claim 1, wherein the configuration information for configuring the inactive UL BWP for UL data communication in the RRC_INACTIVE state includes an extended cyclic prefix (CP).

9. The method of claim 8, wherein, when in the RRC_INACTIVE state, using the configured inactive UL BWP for UL data communication comprises using the extended CP during the UL data communication.

10. The method of claim 1 further comprising, when in the RRC_INACTIVE state, prior to using the configured inactive UL BWP for UL data communication in the RRC_INACTIVE state, switching, by the UE, to the configured inactive UL BWP for UL data communication in the RRC_INACTIVE state.

11. The method of claim 10, wherein the switching occurs when a pre-defined condition is met, wherein the pre-defined condition is one of:
   the configured inactive UL BWP for UL data communication in the RRC_INACTIVE state has a different frequency location and bandwidth or a different sub-carrier spacing (SCS) or a different cyclic prefix (CP) than control resource set 0 (CORESET 0); or
   the configured inactive UL BWP for UL data communication in the RRC_INACTIVE state does not include all resource blocks of CORESET 0 or has a different SCS or a different CP than CORESET 0.

12. The method of claim 10 further comprising, when using the configured inactive UL BWP for UL data communication in the RRC_INACTIVE state, switching, by the UE, to control resource set 0 (CORESET 0) from the configured inactive BWP for UL data communication.

13. The method of claim 1, further comprising:
   when in the RRC_CONNECTED state, determining, by the UE, second configuration information for configuring an inactive downlink (DL) bandwidth part (BWP) for DL data communication in the RRC_INACTIVE state; and
   when in the RRC_INACTIVE state, configuring, by the UE, the inactive DL BWP based on the determined second configuration information and using the configured inactive DL BWP for DL data communication in the RRC_INACTIVE state.

14. The method of claim 13, wherein the scheduling information includes:
   scheduling information for receiving, by the UE, downlink data when in the RRC_INACTIVE state; or
   scheduling information for receiving, by the UE, paging information that includes scheduling information for receiving, by the UE, downlink data when in the RRC_INACTIVE state.

15. The method of claim 13, wherein the inactive DL BWP is specific to the UE.

16. The method of claim 13, wherein the inactive DL BWP is a group specific inactive DL BWP or a cell-specific inactive DL BWP.

17. The method of claim 1, wherein the inactive UL BWP is specific to the UE.

18. The method of claim 1, wherein the inactive UL BWP is a group specific inactive UL BWP or a cell-specific inactive UL BWP.

19. A user equipment (UE) comprising:
   a processor; and
   computer-readable storage media having stored thereon computer executable instructions that when executed by the processor cause the UE to:
      when in a radio resource control (RRC)_CONNECTED state, determine configuration information for configuring an inactive uplink (UL) bandwidth part (BWP) for UL data communication in a RRC_INACTIVE state;
      receive a control message that releases the UE from the RRC_CONNECTED state;
      enter into the RRC_INACTIVE state;
      when in the RRC_INACTIVE state, configure the inactive UL BWP based on the determined configuration information and use the configured inactive UL BWP for UL data communication.

20. The UE of claim 19, wherein the computer executable instructions to determine configuration information for configuring the inactive UL BWP for UL data communication in the RRC_INACTIVE state comprise computer executable instructions to receive the configuration information.

21. The UE of claim 20, wherein the configuration information explicitly defines BWP parameters for the configured inactive UL BWP for UL data communication in the RRC_INACTIVE state.

22. The UE of claim 20, wherein the configuration information indicates a BWP identifier that identifies a previously configured UL BWP that will be used for UL communication in the RRC_INACTIVE state.

23. The UE of claim 19, wherein the configuration information indicates that the configured inactive UL BWP for UL data communication in the RRC_INACTIVE state is a last active BWP of the UE when in the RRC_CONNECTED state before the UE enters the RRC_INACTIVE state.

24. The UE of claim 19, wherein the computer executable instructions when executed by the processor cause the UE to, when in the RRC_INACTIVE state, use the configured inactive UL BWP for UL data communication in the RRC_INACTIVE state, comprise computer executable instructions to transmit UL data using the configured inactive UL BWP for UL data communication in the RRC_INACTIVE state.

25. The UE of claim 19, wherein the configuration information for configuring the inactive UL BWP for UL data communication in the RRC_INACTIVE state includes an extended cyclic prefix (CP), wherein the computer executable instructions when executed by the processor cause the UE, when in the RRC_INACTIVE state, to use the configured inactive UL BWP for UL data communication comprise computer executable instructions to use the extended CP during UL data communication.

26. The UE of claim 19, prior to using the configured inactive UL BWP for UL communication in the RRC_INACTIVE state, the computer readable instructions when executed by the processor cause the UE to switch to the configured inactive UL BWP for UL data communication in the RRC_INACTIVE state.

27. The UE of claim 26, wherein the switching occurs when a pre-defined condition is met, wherein the pre-defined condition is one of:
the configured inactive UL BWP for UL data communication in the RRC_INACTIVE state has a different frequency location and bandwidth or a different subcarrier spacing (SCS) or a different cyclic prefix (CP) than control resource set 0 (CORESET 0); or
the configured inactive UL BWP for UL data communication in the RRC_INACTIVE state does not include all resource blocks of CORESET 0 or has a different SCS or a different CP than CORESET 0.

28. The UE of claim 26, when in the RRC_INACTIVE state, when using the configured inactive UL BWP for UL data communication in the RRC_INACTIVE state, the computer readable instructions when executed by the processor cause the UE to switch to control resource set 0 (CORESET 0) from the configured inactive UL BWP for UL data communication.

29. The UE of claim 19, wherein the computer-readable storage media has stored thereon further computer executable instructions that when executed by the processor cause the UE to:
when in the RRC_CONNECTED state, determining, by the UE, second configuration information for configuring an inactive downlink (DL) bandwidth part (BWP) for DL data communication in the RRC_INACTIVE state; and
when in the RRC_INACTIVE state, configuring, by the UE, the inactive DL BWP based on the determined second configuration information and using the configured inactive DL BWP for DL data communication in the RRC_INACTIVE state.

30. The UE of claim 29, when in the RRC_INACTIVE state, the computer readable instructions when executed by the processor cause the UE to receive downlink control information (DCI) that includes scheduling information.

31. The UE of claim 30, wherein the scheduling information includes:
scheduling information for receiving downlink data when in the RRC_INACTIVE state; or
scheduling information for receiving paging information that includes scheduling information for receiving downlink data when in the RRC_INACTIVE state.

* * * * *